US011748605B2

(12) United States Patent
Liu et al.

(10) Patent No.: US 11,748,605 B2
(45) Date of Patent: *Sep. 5, 2023

(54) INTEGRATED CIRCUIT CHIP DEVICE

(71) Applicant: CAMBRICON TECHNOLOGIES CORPORATION LIMITED, Beijing (CN)

(72) Inventors: Shaoli Liu, Beijing (CN); Xinkai Song, Beijing (CN); Bingrui Wang, Beijing (CN); Yao Zhang, Beijing (CN); Shuai Hu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 313 days.

This patent is subject to a terminal disclaimer.

(21) Appl. No.: 17/134,487

(22) Filed: Dec. 27, 2020

(65) Prior Publication Data
US 2021/0117767 A1 Apr. 22, 2021

Related U.S. Application Data

(63) Continuation of application No. 16/903,304, filed on Jun. 16, 2020, now Pat. No. 11,544,546, which is a (Continued)

(30) Foreign Application Priority Data

Dec. 27, 2017 (CN) .......................... 201711455388.4
Dec. 27, 2017 (CN) .......................... 201711455397.3
Dec. 28, 2017 (CN) .......................... 201711466943.3
Dec. 28, 2017 (CN) .......................... 201711468629.9
Dec. 28, 2017 (CN) .......................... 201711469408.3

(Continued)

(51) Int. Cl.
*G06N 3/063* (2023.01)
*G06N 3/04* (2023.01)

(52) U.S. Cl.
CPC ............... *G06N 3/063* (2013.01); *G06N 3/04* (2013.01)

(58) Field of Classification Search
CPC ...................................................... G06N 3/063
See application file for complete search history.

(56) References Cited

U.S. PATENT DOCUMENTS 9,779,786 B1 10/2017 Wu et al.
2018/0211620 A1 7/2018 Kurokawa et al.
(Continued)

FOREIGN PATENT DOCUMENTS

CN 104572011 A 4/2015
CN 105426344 A 3/2016
(Continued)

OTHER PUBLICATIONS

First Office action issued in related Chinese Application No. 201711455388.4, dated Nov. 22, 2019, 10 pages.
(Continued)

*Primary Examiner* — Simon P Kanaan
(74) *Attorney, Agent, or Firm* — Bayes PLLC

(57) ABSTRACT

An integrated circuit chip device and related products are provided. The integrated circuit chip device is used for performing a multiplication operation, a convolution operation or a training operation of a neural network. The device has the advantages of small calculation amount and low power consumption.

20 Claims, 25 Drawing Sheets

Related U.S. Application Data continuation of application No. PCT/CN2018/123929, filed on Dec. 26, 2018.

(30) Foreign Application Priority Data

Dec. 28, 2017 (CN) .......................... 201711469614.4
Dec. 28, 2017 (CN) .......................... 201711469615.9

(56) References Cited

U.S. PATENT DOCUMENTS

2019/0042870 A1  2/2019  Chen et al.
2020/0090029 A1  3/2020  Suzuki

FOREIGN PATENT DOCUMENTS

| CN | 106126481 A | 11/2016 |
| CN | 107229967 A | 10/2017 |
| CN | 107330515 A | 11/2017 |
| CN | 109961136 A | 7/2019 |
| CN | 109961138 A | 7/2019 |

OTHER PUBLICATIONS

First Office action issued in related Chinese Application No. 201711455397.3, dated Nov. 14, 2019, 8 pages.
Second Office action issued in related Chinese Application No. 201711455397.3, dated Mar. 3, 2020, 7 pages.
First Office action issued in related Chinese Application No. 201711469615.9, dated Nov. 20, 2019, 10 pages.
First Office action issued in related Chinese Application No. 201711468629.9, dated Dec. 3, 2019, 8 pages.
Extended European Search Report in related European Application No. 20203232.2, dated Feb. 4, 2021 (7 pages).
Office Action in related Chinese Application No. 201711466943.3 dated Nov. 29, 2019 (10 pages).
Farabet et al., "Hardware Accelerated Convolutional Neural Networks for Synthetic Vision Systems", IEEE International Symposium on Circuits and Systems, May 30, 2010 (4 pages).

INTEGRATED CIRCUIT CHIP DEVICE

CROSS-REFERENCE TO RELATED APPLICATIONS

This application is a continuation of U.S. patent application Ser. No. 16/903,304, filed Jun. 16, 2020, which is a continuation of International Application No. PCT/CN2018/123929, filed Dec. 26, 2018, which claims the benefits of priority to Chinese Application Nos. 201711455388.4, filed Dec. 27, 2017; 201711455397.3, filed Dec. 27, 2017; 201711466943.3, filed Dec. 28, 2017; 201711468629.9, filed Dec. 28, 2017; 201711469408.3, filed Dec. 28, 2017; 201711469614.4, filed Dec. 28, 2017; and 201711469615.9, filed Dec. 28, 2017. The entire contents of each of the above-identified applications are expressly incorporated herein by reference.

TECHNICAL FIELD

The present disclosure relates to the field of neural network, and particularly relates to an integrated circuit chip device.

BACKGROUND

ANN (Artificial Neural Network) is a research focus emerged in 1980s in the field of artificial intelligence. ANN abstracts the human brain neuron network in terms of information processing to establish a simple model, and then builds different networks with different connection methods. ANN is often referred to as neural network in engineering and academia. Neural networks are a type of computational model. They are formed by a large number of interconnecting nodes (or may be referred to as neurons). Existing neural networks rely on CPU (Central Processing Unit) or GPU (Graphics Processing Unit) to realize neural network operations which often require a large amount of computations and cause high power consumption.

SUMMARY

The present disclosure provides an integrated circuit chip device and a product thereof. Compared with the existing integrated circuit chip device, the disclosed integrated circuit chip device and the product thereof can reduce computations and power consumption.

An aspect of the present disclosure provides an integrated circuit chip device including a main processing circuit and a plurality of basic processing circuits.

The plurality of basic processing circuits are arranged as an array. Each basic processing circuit is connected to an adjacent basic processing circuit. The main processing circuit is connected to n basic processing circuits in a first row, n basic processing circuits in an $m^{th}$ row, and m basic processing circuits in a first column.

The main processing circuit is configured to perform respective neural network computations in series, and transfer data to the basic processing circuits that are connected to the main processing circuit.

The plurality of basic processing circuits are configured to perform computations in the neural network in parallel according to data being transferred, and transfer computation results to the main processing circuit through the basic processing circuits that are connected to the main processing circuit.

A second aspect provides a neural network computing device. The neural network computing device includes one or more of the integrated circuit chip devices provided in the first aspect.

A third aspect provides a combined processing device. The combined processing device includes: the neural network computing device provided in the second aspect, a general interconnection interface, and a general processing device.

The neural network computing device is connected to the general processing device through the general interconnection interface.

A fourth aspect provides a chip that integrates the device of the first aspect, the device of the second aspect, or the device of the third aspect.

A fifth aspect provides an electronic device which includes the chip of the fourth aspect.

A sixth aspect provides a neural network operation method. The method is applied to an integrated circuit chip device. The integrated circuit chip device includes: the integrated circuit chip device provided in the first aspect which is configured to perform a neural network operation.

It can be seen that, according to examples of the present disclosure, a data type conversion circuit is provided to convert a type of a data block before an operation is performed, which may save resources for transmission and computation, and may thus have technical effects of low power consumption and a small amount of computation.

BRIEF DESCRIPTION OF THE DRAWINGS

In order to illustrate the technical solutions in the examples of the present disclosure more clearly, the drawings to be used in the description of the examples are briefly explained below. Obviously, the drawings in the description below are some examples of the present disclosure. Other drawings can be obtained according to the disclosed drawings without any creative effort by those skilled in the art.

DETAILED DESCRIPTION

Figure 1A:
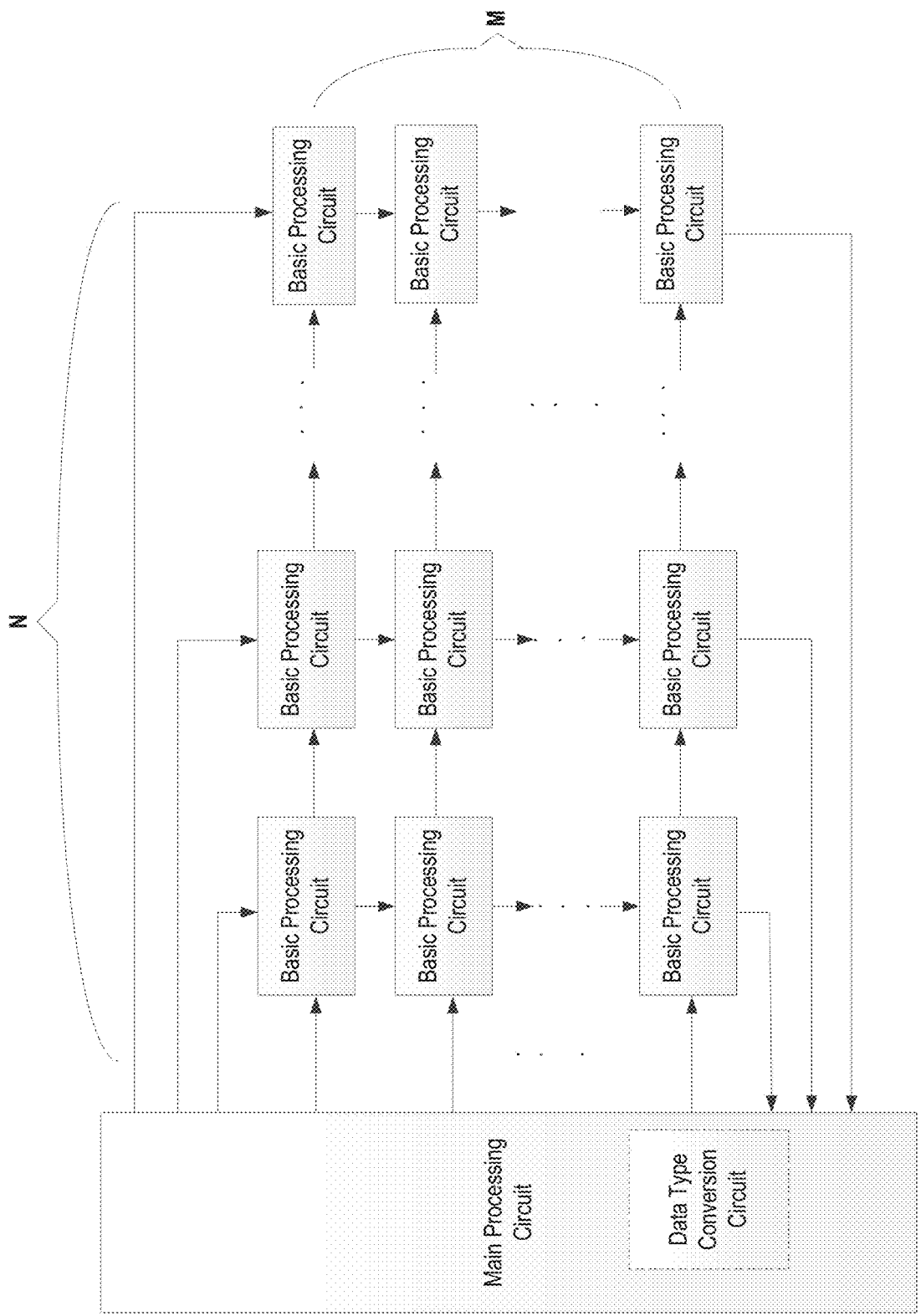
FIG. 1a is a structural diagram of an integrated circuit chip device.

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

Terms such as "first", "second", "third", and "fourth" in the specification, the claims, and the drawings are used for distinguishing different objects rather than describing a specific order. In addition, terms such as "include", "have", and any variant thereof are used for indicating non-exclusive inclusion. For instance, a process, a method, a system, a product, or an equipment including a series of steps or units is not limited to the listed steps or units, but may include steps or units that are not listed, or may include other steps or units inherent to the process, the method, the product, or the equipment.

Reference to "example" means that a particular feature, a structure, or a characteristic described in conjunction with the example may be included in at least one example of the present disclosure. The use of the term in various places in the specification does not necessarily refer to the same example, nor is it referring independent or alternative examples that are mutually exclusive with other examples. It is explicitly and implicitly understood by those skilled in the art that the examples described in the specification may be combined with other examples.

In a device provided by a first aspect of the present disclosure, the main processing circuit is configured to obtain a data block to be computed and a computation instruction, convert the data block to be computed to a data block of a fixed point type using a data type conversion circuit, classify the data block to be computed of the fixed point type into a distribution data block and a broadcasting data block according to the computation instruction, partition the distribution data block to obtain a plurality of basic data blocks, distribute the plurality of basic data blocks to basic processing circuits connected to the main processing circuit, and broadcast the broadcasting data block to the basic processing circuits connected to the main processing circuit.

A basic processing circuit is configured to perform inner product computations on the basic data blocks of the fixed point type and the broadcasting data block of the fixed point type to obtain computation results, and transfer the computation results to the main processing circuit.

Alternatively, a basic processing circuit is configured to forward the basic data blocks and the broadcasting data block to another basic processing circuit. The another basic processing circuit is configured to perform inner product computations of the fixed point type to obtain computation results, and transfer the computation results to the main processing circuit.

The main processing circuit is configured to convert the computation results to data of a floating point type using the data type conversion circuit, and process the data of the floating point type to obtain an instruction result of the data block to be computed and the computation instruction.

In the device provided by the first aspect of the present disclosure, the main processing circuit is configured to broadcast the broadcasting data block as a whole to the basic processing circuits connected to the main processing circuit.

In the device provided by the first aspect of the present disclosure, the basic processing circuit is configured to perform inner product processing on the basic data blocks of the fixed point type and the broadcasting data block of the fixed point type to obtain results of inner product processing, accumulate the results of inner product processing to obtain computation results, and transfer the computation results to the main processing circuit.

In the device provided by the first aspect of the present disclosure, if the computation results are the results of inner product processing, the main processing circuit is configured to accumulate the computation results to obtain accumulation results, and sort the accumulation results to obtain the instruction result of the data block to be computed and the computation instruction.

In the device provided by the first aspect of the present disclosure, the main processing circuit is configured to partition the broadcasting data block into a plurality of partial broadcasting data blocks, and sequentially broadcast the plurality of partial broadcasting data blocks to the basic processing circuits. The plurality of partial broadcasting data blocks constitute the broadcasting data block.

In the device provided by the first aspect of the present disclosure, the basic processing circuit is configured to perform inner product processing on the partial broadcasting data blocks of the fixed point type and the basic data blocks of the fixed point type once to obtain results of inner product processing, accumulate the results of inner product processing to obtain partial computation results, and transfer the partial computation results to the main processing circuit.

In the device provided by the first aspect of the present disclosure, the basic processing circuit is configured to reuse the partial broadcasting data blocks for n times, perform inner product computations on the partial broadcasting data blocks and n basic data blocks to obtain n partial processing results, accumulate the n partial processing results respectively to obtain n partial computation results, and transfer the n partial processing results to the main processing circuit, where n is an integer greater than or equal to 2.

In the device provided by the first aspect of the present disclosure, the main processing circuit includes a main register or a main on-chip caching circuit.

The basic processing circuit include a basic register or a basic on-chip caching circuit.

In the device provided by the first aspect of the present disclosure, the main processing circuit includes one or more of a vector computing unit circuit, an ALU (arithmetic and logic unit) circuit, an accumulator circuit, a matrix transposition circuit, a direct memory access circuit, or a data rearrangement circuit.

In the device provided by the first aspect of the present disclosure, the main processing circuit is configured to obtain a data block to be computed and a computation instruction, classify the data block to be computed into a distribution data block and a broadcasting data block according to the computation instruction, partition the distribution data block to obtain a plurality of basic data blocks, distribute the plurality of basic data blocks to basic processing circuits connected to the main processing circuit, and broadcast the broadcasting data block to the basic processing circuits connected to the main processing circuit.

The basic processing circuit is configured to convert the basic data blocks and broadcasting data block to data blocks of the fixed point type, perform inner product computations on the data blocks of the fixed point type to obtain computation results, convert the computation results to floating point data, and transfer the floating point data to the main processing circuit.

Alternatively, the basic processing circuit is configured to convert the broadcasting data block to a data block of the fixed point type, forward the data block of the fixed point type to another basic processing circuit. The another basic processing circuit is configured to perform inner product computations to obtain computation results, convert the computation results to floating point data, and transfer the floating point data to the main processing circuit.

The main processing circuit is configured to process the computation results to obtain the instruction result of the data block to be computed and the computation instruction.

In the device provided by the first aspect of the present disclosure, the data may be one or more of: a vector, a matrix, a three-dimensional data block, a four-dimensional data block, and an n-dimensional data block In the device provided by the first aspect of the present disclosure, if the computation instruction is a multiplication instruction, the main processing circuit is configured to determine a multiplier data block as the broadcasting data block and a multiplicand data block as the distribution data block.

Alternatively, if the computation instruction is a convolution instruction, the main processing circuit is configured to determine a convolution input data block as the broadcasting data block and a convolution kernel as the distribution data block.

A neural network operation includes one or more of a convolution computation, a matrix-multiply-matrix computation, a matrix-multiply-vector computation, a bias computation, a fully connected computation, a GEMM computation, a GEMV computation, and an activation computation.

FIG. 1a shows an integrated circuit chip device provided by the present disclosure. The integrated circuit chip device includes: a main processing circuit and a plurality of basic processing circuits. The plurality of basic processing circuits are arranged in a form of array (an m*n array), where m and n are integers greater than or equal to 1, and at least one of m and n is greater than or equal to 2. For the plurality of basic processing circuits that are arranged in the form of an m*n array, each basic processing circuit is connected to an adjacent basic processing circuit, and the main processing circuit is connected to k basic processing circuits of the plurality of basic processing circuits. The k basic processing circuits may be: n basic processing circuits in a first row, n basic processing circuits in an $m^{th}$ row, and m basic processing circuits in a first column. In the integrated circuit chip device shown in FIG. 1a, the main processing circuit and/or the plurality of basic processing circuits may include a data type conversion circuit. Specifically, some basic processing circuits of the plurality of basic processing circuits may include data type conversion circuits. For instance, in an alternative example, k basic processing circuits may include data type conversion circuits. In this way, n basic processing circuits may convert the data type of data of m basic processing circuits of a current column. This configuration may improve computational efficiency and reduce power consumption. This is because that the n basic processing circuits in the first row are the first to receive data sent from the main processing circuit, and by converting the received data into fixed point data, subsequent computations performed by basic processing circuits and data transferred by the basic processing circuits during the subsequent computations may be reduced. Similarly, setting data type conversion circuits in the m basic processing circuits of the first column may also have technical effects of fewer computations and less power consumption. In addition, according to the above-mentioned structure, the main processing circuit may use a dynamic data transfer strategy. For instance, the main processing circuit may broadcast data for broadcasting to the m basic processing circuits of the first column, and distribute data for distribution to the n basic processing circuits of the first row. Technical effects of the example include that by transferring different data to the basic processing circuits via different data input ports, the basic processing circuit may know the type of data merely according to a receiving port of the data without the need of distinguishing the type of the received data.

The main processing circuit is configured to perform respective neural network computations in series, and transfer data to the basic processing circuits that are connected to the main processing circuit. The neural network computations in series may include but are not limited to: accumulation computations, ALU computations, activation computations, and the like.

The plurality of basic processing circuits are configured to perform computations in the neural network in parallel according to data being transferred, and transfer computation results to the main processing circuit through the basic processing circuits that are connected to the main processing circuit. The computations in the neural network that are performed in parallel may include but are not limited to: inner product computations, matrix or vector multiplication computations, and the like.

The main processing circuit may include: a data transfer circuit, a data receiving circuit or interface. A data distribution circuit and a data broadcasting circuit may be integrated in the data transfer circuit. In a certain application, the data distribution circuit and the data broadcasting circuit may be set independently. Data for broadcasting refers to the data that needs to be sent to each basic processing circuit. Data for distribution refers to data that needs to be sent to some basic processing circuit selectively. Specifically, taking a convolution computation as an instance, since convolution input data of the convolution computation needs to be sent to all basic processing circuits, the convolution input data is data for broadcasting, and since a convolution kernel needs to be sent to some basic processing circuit selectively, the convolution kernel is data for distribution. A method for selecting a basic processing circuit to distribute data may be determined by the main processing circuit according to the loads and other allocation methods. A method for broadcasting data refers to transferring data for broadcasting to each basic processing circuit by broadcasting (in a certain application, the data for broadcasting may be transferred to each basic processing circuit by broadcasting for once or a plurality of times, and the times of broadcasting are not restricted in the example of the present disclosure). A method for distributing data refers to selectively transferring data for distribution to some basic processing circuits.

Figure 1B:
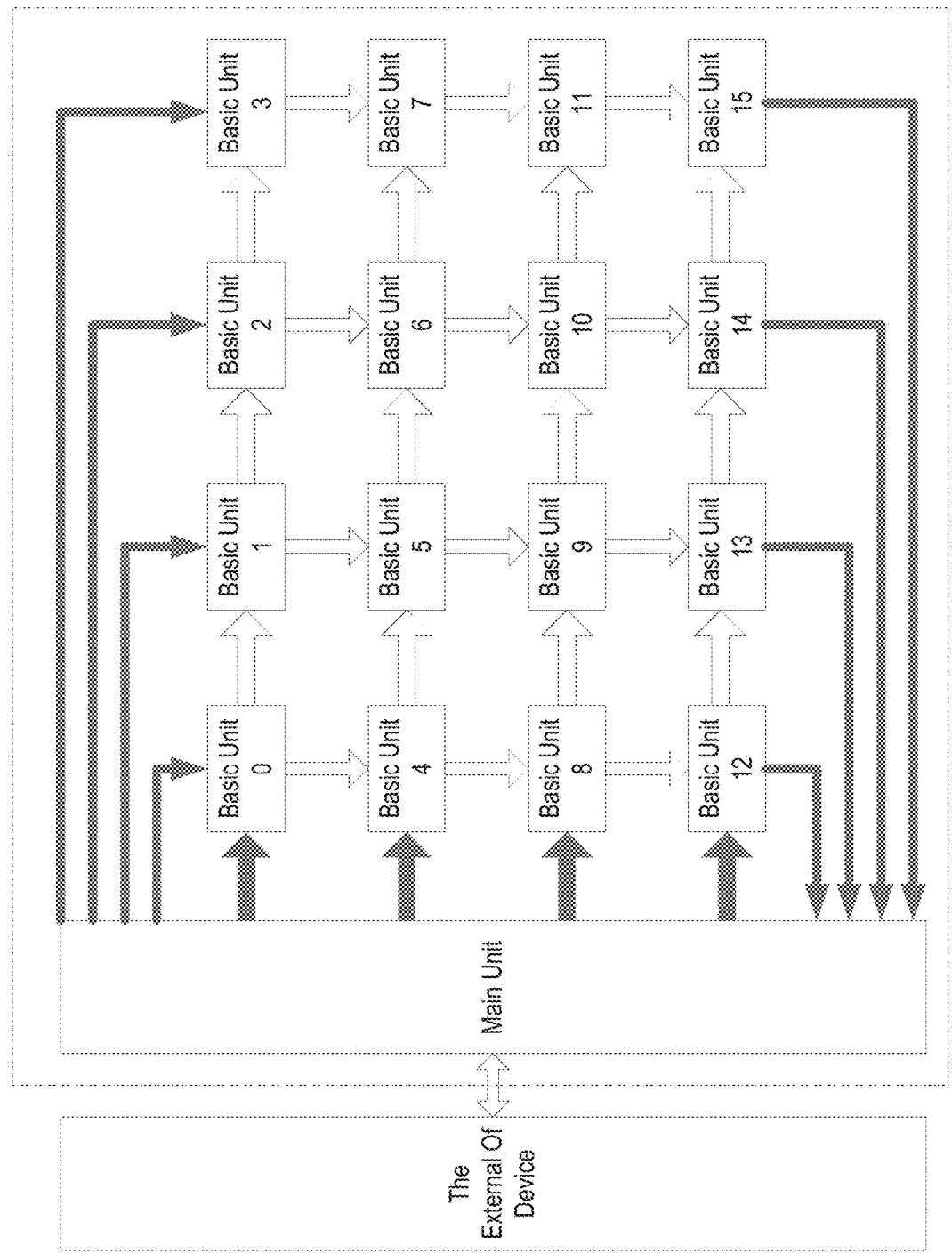
FIG. 1b is a structural diagram of other integrated circuit chip device.
Figure 1C:
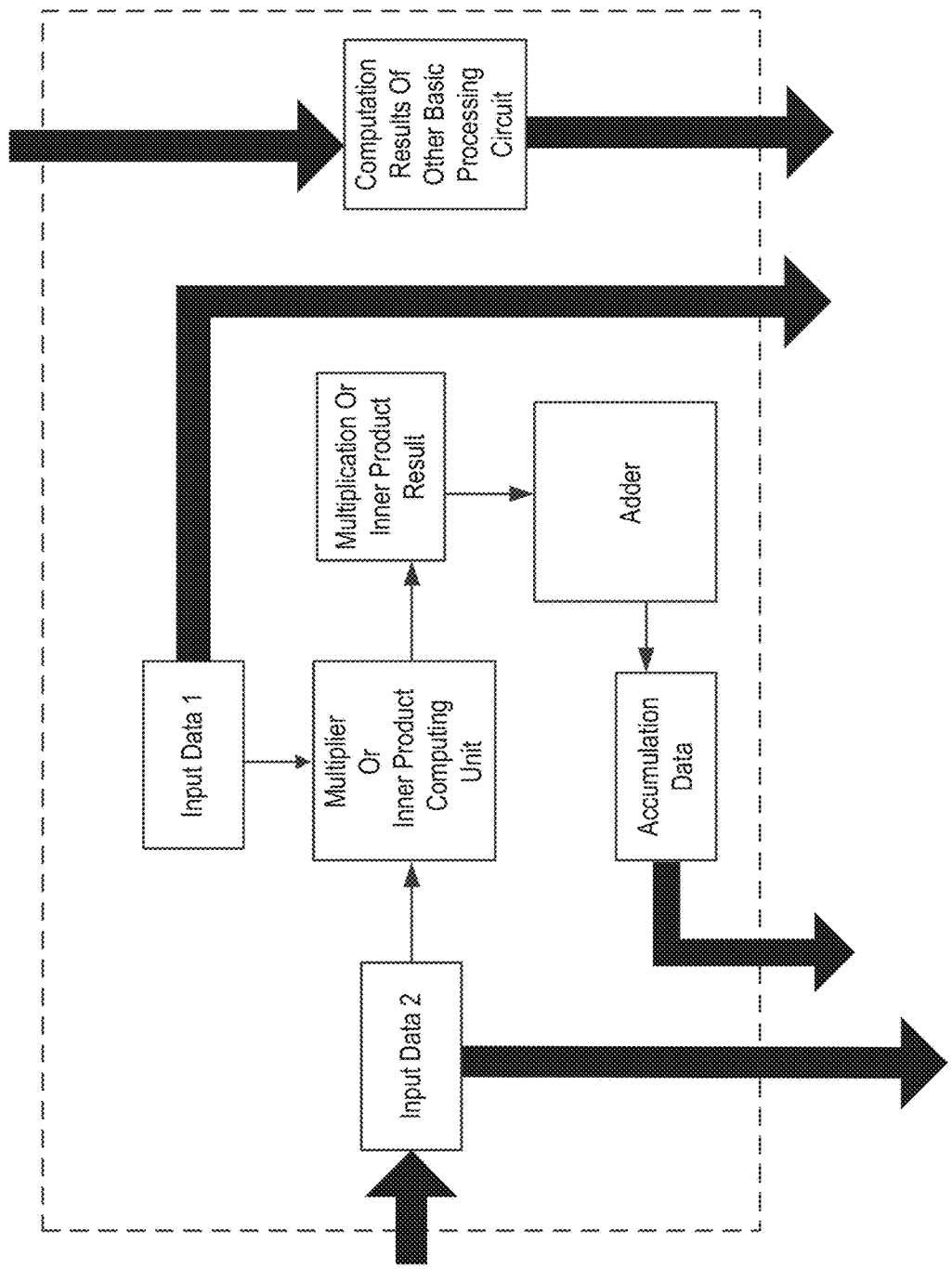
FIG. 1c is a structural diagram of a basic processing circuit.
Figure 1D:
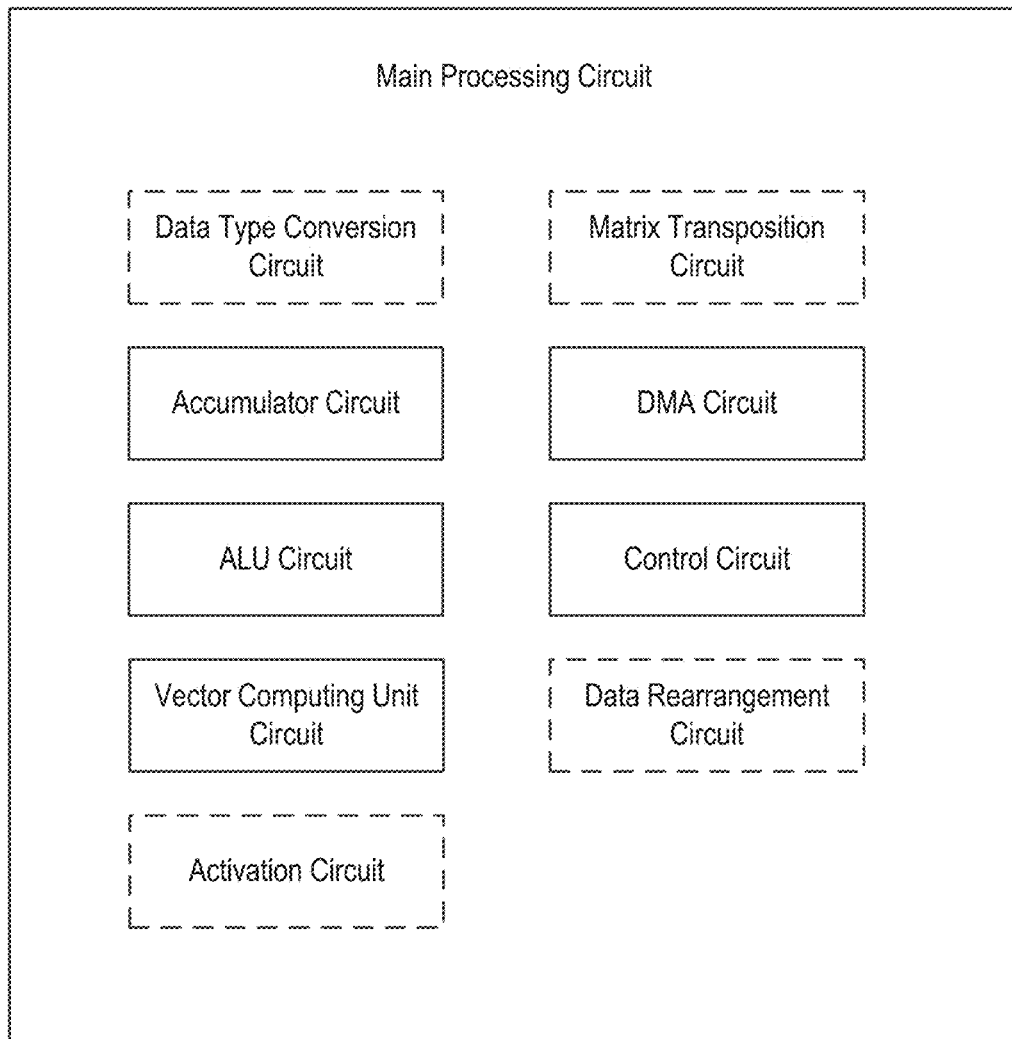
FIG. 1d is a structural diagram of a main processing circuit.

The main processing circuit (as shown in FIG. 1d) may include a register and/or an on-chip caching circuit, and may further include: a control circuit, a vector computing unit circuit, an ALU (Arithmetic and Logic Unit) circuit, an accumulator circuit, a DMA (Direct Memory Access) circuit, and the like. In a certain application, the main processing circuit may further include a conversion circuit (e.g., a matrix transposition circuit), a data rearrangement circuit, an activation circuit, or the like.

Each basic processing circuit may include a basic register and/or a basic on-chip caching circuit. Each basic processing circuit may further include one or more of an inner product computing unit circuit, a vector computing unit circuit, an accumulator circuit, and the like. The inner product computing unit circuit, the vector computing unit circuit, and the accumulator circuit may all be integrated circuits, or may also be circuits that are set independently.

Alternatively or additionally, the accumulator circuits of the n basic processing circuits of the $m^{th}$ row may perform accumulation computations of inner product computations. This is because that the basic processing circuits of the $m^{th}$ row can receive multiplication results of all basic processing circuits of a current column, and the n basic processing circuits of the $m^{th}$ row can perform accumulation computations of inner product computations. In this way, computing resources may be effectively allocated, and the power consumption may be reduced. This technical scheme is particularly suitable for a case where m is relatively large.

The main processing circuit may configure a circuit to perform data type conversion. Specifically, a circuit may be configured in an explicit manner or an implicit manner. For the explicit manner, the main processing circuit can configure a special indication or instruction. When a basic processing circuit receives the special indication or instruction, it determines to perform data type conversion. If a basic processing circuit does not receive the special indication or instruction, it determines not to perform data type conversion. Data type conversion may also be performed implicitly. For instance, when the basic processing circuits receive floating point data and determine that an inner product computation needs to be performed, the basic processing circuits may convert the data into fixed point data. When a circuit is configured in an explicit manner, the special indication or instruction may configure a descending sequence. Every time after passing a basic processing circuit, the value of the descending sequence reduces by 1. The basic processing circuit reads the value of the descending sequence. If the value is greater than zero, the basic processing circuit performs data type conversion. If the value is equal to or less than zero, the basic processing circuit does not perform data type conversion. This configuration is set according to the basic processing circuits arranged in the form of the array. For instance, for the m basic processing circuits of the $i^{th}$ column, the main processing circuit requires the 5 basic processing circuits at the front to perform data type conversion. In this case, the main processing circuit sends a special instruction that includes a descending sequence, where an initial value of the descending sequence may be 5. Every time after passing a basic processing circuit, the value of the descending sequence reduces by 1. At a fifth basic processing circuit, the value of the descending sequence is 1, and at a sixth basic processing circuit, the value of the descending sequence is 0. At this point, the sixth basic processing circuit may not perform data type conversion. By using this method, the main processing circuit may dynamically configure an execution subject and a count of execution times of data type conversion.

An example of the present disclosure provides an integrated circuit chip device. The integrated circuit chip device includes a main processing circuit (may also be referred to as a main unit) and a plurality of basic processing circuits (may also be referred to as basic units). A structure of the example is shown in FIG. 1b. What is inside a dashed box is an internal structure of the neural network computing device. Gray arrows indicate data transfer paths between the main processing circuit and a basic processing circuit array. Outlined arrows indicate data transfer paths between the respective basic processing circuits (adjacent basic processing circuits) in the basic processing circuit array. The length and width of the basic processing circuit array may be different. In other words, the values of m and n may be different or the same. The present disclosure does not restrict the specific values.

FIG. 1c shows a circuit structure of a basic processing circuit. A dashed box in the figure indicates the border of the basic processing circuit. A thick arrow that intersects the dashed box indicates a data input pathway and a data output pathway (the arrow pointing to the internal of the dashed box is the input pathway, and the arrow pointing to the external of the dashed box is the output pathway). A rectangular box inside the dashed box indicates a storage unit circuit (a register and/or an on-chip cache) including input data 1, input data 2, a result of multiplication or inner product, and accumulation data. A diamond-shaped box indicates a computing unit circuit including a multiplier or inner product computing unit, and an adder.

In the present disclosure, the neural network computing device includes a main processing circuit and 16 basic processing circuits (the 16 basic processing circuit are given by way of illustration, other number may be used in a certain application).

In the present example, a basic processing circuit may have two data input interfaces and two data output interfaces. In the following description of the present example, a horizontal input interface (a horizontal arrow pointing to a present unit as shown in FIG. 1b) is referred to as an input 0, a vertical input interface (a vertical arrow pointing to a present unit as shown in FIG. 1b) is referred to as an input 1; a horizontal data output interface (a horizontal arrow pointing away from a present unit as shown in FIG. 1b) is referred to as an output 0, a vertical data output interface (a vertical arrow pointing away from a present unit as shown in FIG. 1b) is referred to as an output 1.

The data input interface and the data output interface of each basic processing circuit may be connected to different units respectively which includes the main processing circuit and other basic processing circuits.

In the present example, inputs 0 of the four basic processing circuits 0, 4, 8, 12 (see FIG. 1b for the serial numbers) are connected to the data output interfaces of the main processing circuit.

In the present example, inputs 1 of the four basic processing circuits 0, 1, 2, 3 are connected to the data output interfaces of the main processing circuit.

In the present example, outputs 1 of basic processing circuits 12, 13, 14, 15 are connected to the data input interfaces of the main processing circuit.

Connections of the output interfaces of the basic processing circuits and the input interfaces of other basic processing circuits of the present example can be seen in FIG. 1b, and thus are not explained in detail here.

Specifically, an output interface S1 of an S unit is connected to an input interface P1 of a P unit, which indicates that the P unit can receive data that the S unit sends to the S1 interface via the P1 interface.

The present example includes a main processing circuit. The main processing circuit is connected to an external device (in other words, the main processing circuit has both input interfaces and output interfaces). Some data output interfaces of the main processing circuit are connected to the data input interfaces of some basic processing circuits. Some data input interfaces of the main processing circuit are connected to the data output interfaces of some basic processing circuits.

An example of the present disclosure provides a method of using the integrated circuit chip device.

Data involved in the method provided by the present disclosure may be data of any data type. For instance, the data may be data represented by a floating point number of any bit width, or data represented by a fixed point number of any bit width.

Figure 1E:
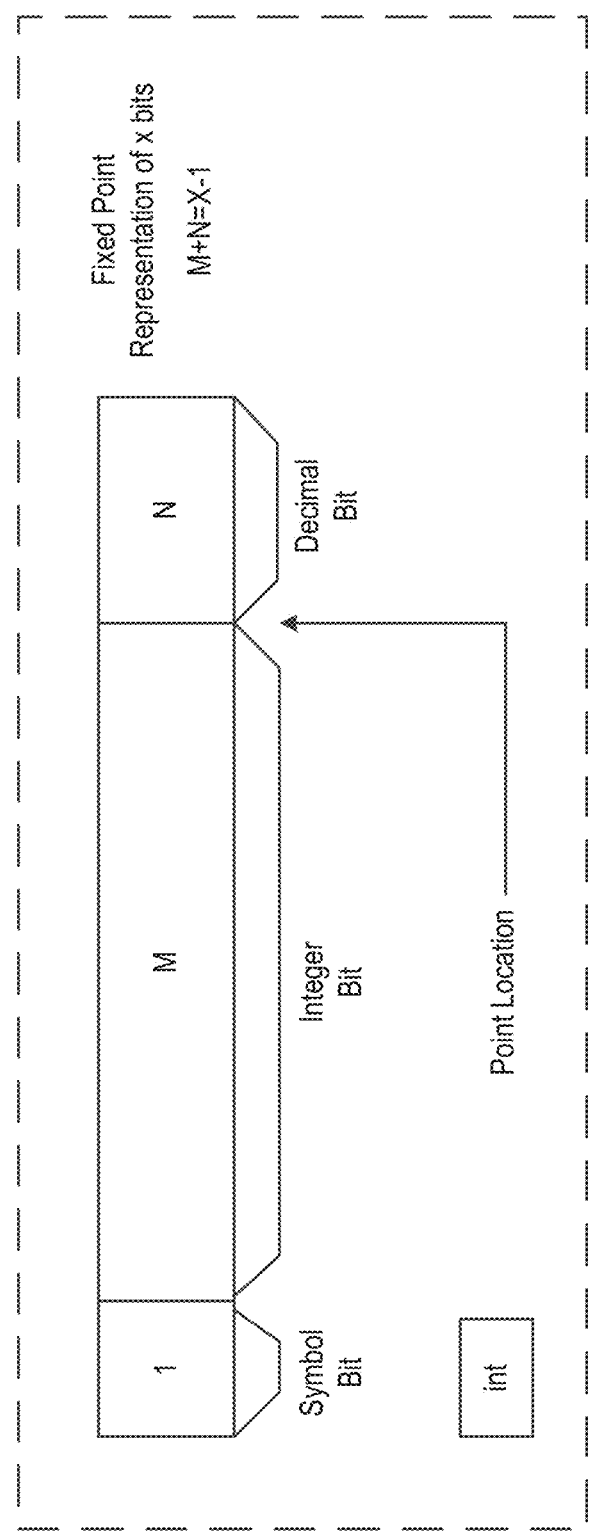
FIG. 1e is a schematic diagram of a fixed point data type.

FIG. 1e is a structural diagram of the fixed point data, which shows a method of representing fixed point data. For a computing system, the storage bit of one set of floating point data is 32 bits. For fixed point data, particularly a data representation using the floating point data shown in FIG. 1e, the storage bit of one set of fixed point data can be reduced to below 16 bits, which may greatly reduce transferring overhead between computing units during conversion. In addition, for a computing unit, the storage space of data having fewer bits may be smaller, which in other words, means that the storage overhead may be less, computations may also be reduced, and the computational overhead may be reduced. In this case, the fixed point data shown in FIG. 1e may reduce the computational overhead and storage overhead. However, data type conversion requires some computational overhead, which will be referred to as conversion overhead below. For data that requires a large amount of computations and storage, the conversion overhead is almost negligible compared with subsequent computational overhead, storage overhead, and transferring overhead. In this case, the present disclosure adopts a technical solution of converting data into fixed point data for data that require a large amount of computations and a large amount of storage. On the contrary, for data that requires a small amount of computations and storage, the data require less computational overhead, storage overhead, and transferring overhead. Since the precision of fixed point data is lower than the precision of floating point data, if fixed point data is used, under the premise that the amount of computations is relatively small, the fixed point data may be converted to floating point data so that the precision of computations can be guaranteed. In other words, the precision of computations may be improved by increasing a small amount of overhead.

A computation that needs to be completed in the basic processing circuits may be performed according to the following method:

converting, by the main processing circuit, the type of data, then transferring the data to the basic processing circuits for computations (for instance, the main processing circuit may convert a floating point number to a fixed point number that has less bit width, and may transfer the fixed point number to the basic processing circuits. Technical effects of the method include that the bit width of data being transferred may be reduced, the total count of bits being transferred may be reduced, the basic processing circuits may achieve better efficiency with less power consumption when performing fixed point computations of such bit width);

after receiving the data, converting, by the basic processing circuits, the data type of the data, then performing computations (for instance, the basic processing circuits receive a floating point number transferred from the main processing circuit, then convert the floating point number to a fixed point number for performing computations. In this way, the computational efficiency may be improved, and the power consumption may be reduced); and obtaining, by the basic processing circuits, results from computations, converting the data type of the results, then transferring the results to the main processing circuit (for instance, a computation result of a floating point number obtained by a basic processing circuit may first be converted into a fixed point number having a less bit width, then the fixed point number is transferred to the main processing circuit. Technical effects of this method include that the bit width during the transferring process may be reduced, and better efficiency with less power consumption may be realized).

Figure 2A:
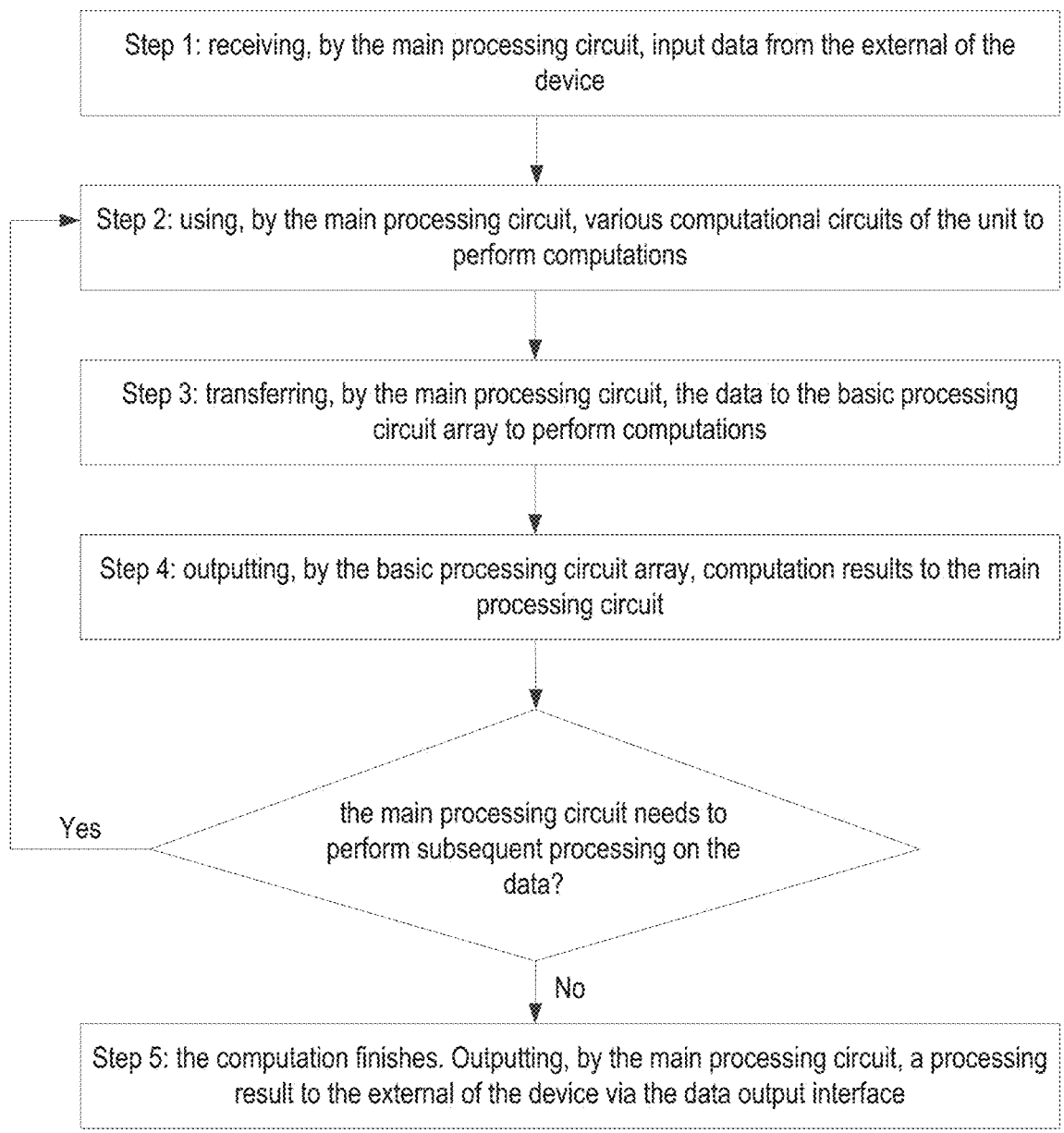
FIG. 2a is a schematic diagram showing a method of using a basic processing circuit.
Figure 2B:
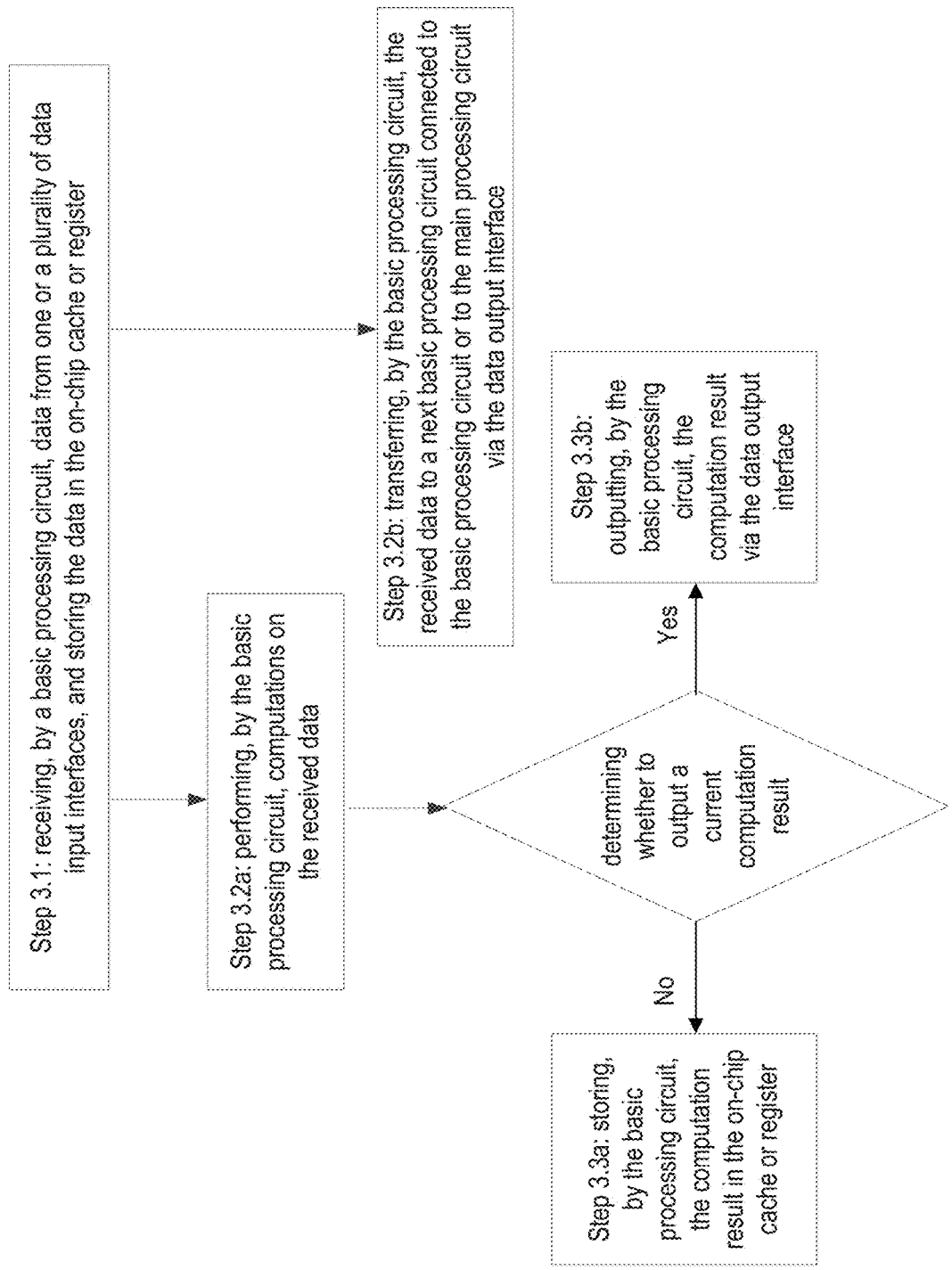
FIG. 2b is a schematic diagram showing data transfer by a main processing circuit.

A method of using the basic processing circuits (as shown in FIG. 2a) includes:

receiving, by the main processing circuit, input data to be computed from the external of the device;

Alternatively or additionally, using, by the main processing circuit, various computational circuits of the present unit such as the vector computational circuit, the inner product computing unit circuit, and the accumulator circuit to perform computations on the data; and transferring (as shown in FIG. 2b), by the main processing circuit via the data output interface, the data to the basic processing circuit array (the set of all the basic processing circuits is referred to as a basic processing circuit array).

A method of transferring data here may be transferring data to some basic processing circuits directly, which in other words, refers to a method of broadcasting for a plurality of times.

A method of transferring data here may also be transferring different data to different basic processing circuits, which in other words, refers to a method of distributing.

The method of using the basic processing circuits further includes: performing, by the basic processing circuit array, computations on the data; and performing, by the basic processing circuits, computations after receiving the data.

Alternatively or additionally, after a basic processing circuits receives data, the method includes: outputting, by a basic processing circuit, the data via the data output interface of the unit (the basic processing circuit transfers data to another basic processing circuit that does not receive data from the main processing circuit directly).

Alternatively or additionally, the method includes: transferring, by a basic processing circuit, a computation result (an intermediate result or a final computation result) via the data output interface;

receiving, by the main processing circuit, output data returned by the basic processing circuit array;

Alternatively or additionally, processing (such as accumulating or activation operating), by the main processing circuit, the data received from the basic processing circuit array; and transferring, by the main processing circuit, a processing result to the external of the device via the data output interface after finishing the processing.

The present disclosure may use the circuit device to perform a matrix-multiply-vector computation (a matrix-multiply-vector computation refers to a computation of obtaining a vector by performing inner product computations between each row of a matrix and a vector, then placing the results according to a corresponding order).

Figure 2C:
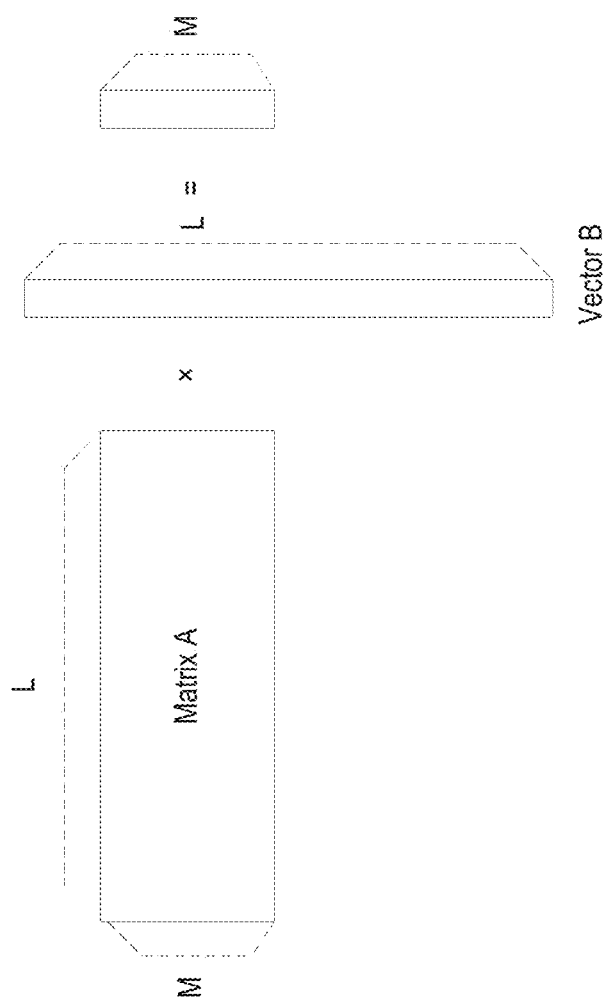
FIG. 2c is a schematic diagram showing a matrix-multiply-vector computation.

Below is a description of performing multiplication of a matrix S with a size of M rows and L columns and a vector P with a length of L, which is shown in FIG. 2c.

The present method may use all or some of the basic processing circuits of the neural network computing device. It is assumed that K basic processing circuits are used.

The main processing circuit may transfer data in all or some rows of the matrix S to each basic processing circuit of the k basic processing circuits.

In an alternative example, each time, the control circuit of the main processing circuit transfers a number or some numbers of data in a row of the matrix S to a basic processing circuit. For instance, when a number is transferred at a time, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . ; or when some numbers are transferred at a time, first two numbers (a first number and a second number) in the $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . .

In an alternative example, each time, the control circuit of the main processing circuit transfers a number or some numbers of some rows of data of the matrix S to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, 3rd numbers in the $3^{rd}$, $4^{th}$, and $5^{th}$ rows are transferred at a $3^{rd}$ time, . . . ; or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . .

The control circuit of the main processing circuit successively transfers data in the vector P to the zeroth basic processing circuit.

After receiving the data of the vector P, the zeroth basic processing circuit transfers the data to a next basic processing circuit that is connected to the zeroth basic processing circuit, which is the basic processing circuit 1.

Specifically, some basic processing circuits cannot obtain data required for computations directly from the main processing circuit. For instance, the basic processing circuit 1 in FIG. 2d only has one data input interface that is connected to the main processing circuit. In this case, the basic processing circuit 1 can only obtain data of the matrix S directly from the main processing circuit, and has to obtain data of the vector P from the basic processing circuit 0. Similarly, after receiving the data of the vector P, the basic processing circuit 1 continues to output the data to the basic processing circuit 2.

Each basic processing circuit performs computations on the received data. The computations may include but are not limited to: an inner product computation, a multiplication computation, an addition computation, and the like.

In an alternative example, each time, a basic processing circuit performs multiplication on one group or a plurality of groups of two sets of data, then accumulates results in the register and/or the on-chip cache.

In an alternative example, each time, a basic processing circuit computes an inner product of one group or a plurality of groups of two vectors, then accumulates results in the register and/or on-chip cache.

After obtaining a result by computing, the basic processing circuit outputs the result through the data output interface (in other words, transfers the result to another basic processing circuit connected to the basic processing circuit).

In an alternative example, the computation result may be a final result or an intermediate result of an inner product computation.

After the basic processing circuit receives a computation result from another basic processing circuit, the basic processing circuit transfers the data to yet another basic processing circuit that is connected to the basic processing circuit or to the main processing circuit.

The main processing circuit receives inner product computation results transferred by each of the basic processing circuits, and processes (which may be an accumulation computation, an activation computation, or the like) the results to obtain a final result.

Below is a description of an example of using the computing device to realize a matrix-multiply-vector computation.

Figure 2D:
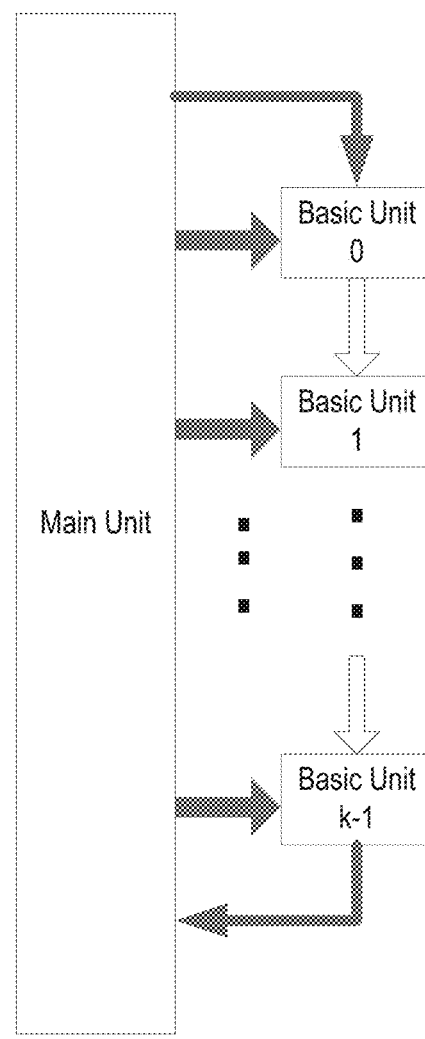
FIG. 2d is a structural diagram of an integrated circuit chip device.
Figure 2E:
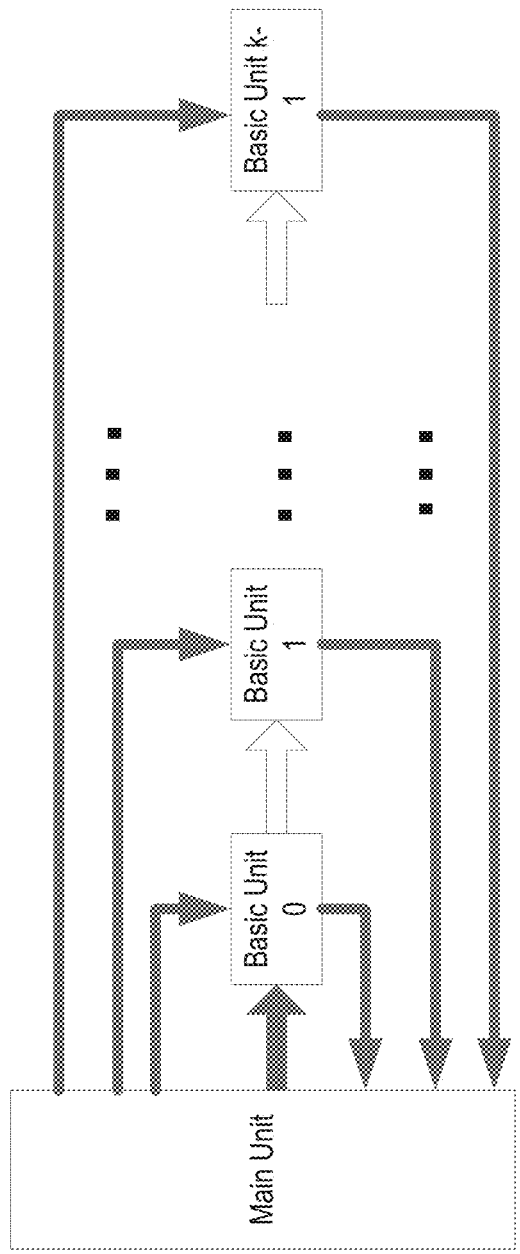
FIG. 2e is a structural diagram of another integrated circuit chip device.

In an alternative example, a plurality of basic processing circuits used in the method may be arranged according to a manner shown in FIG. 2d or FIG. 2e.

As shown in FIG. 2c, the data type conversion circuit of the main processing circuit converts a matrix S and a matrix P into fixed point data. The control circuit of the main processing circuit divides M rows of data of the matrix S into K groups. An $i^{th}$ basic processing circuit is configured to perform the computation of an $i^{th}$ group (a set of rows in the group of data is referred to as Ai).

A method of grouping the M rows of data is any grouping method as long as there is no repeated allocation.

In an alternative example, the following grouping method may be used: allocating a $j^{th}$ row to a j % $K^{th}$ (% is a computation for taking a remainder) basic processing circuit.

As an alternative example, in a case where rows cannot be grouped evenly, some rows may be grouped evenly first, and the remaining rows may be allocated in any manner.

Each time, the control circuit of the main processing circuit successively transfers data of some or all rows in the matrix S to corresponding basic processing circuits.

In an alternative example, each time, the control circuit of the main processing circuit transfers one or a plurality of data in a row of data of an $i^{th}$ group of data Mi that the $i^{th}$ basic processing circuit is responsible for to the $i^{th}$ basic processing circuit.

In an alternative example, each time, the control circuit of the main processing circuit transfers one or a plurality of data in each row of some or all rows of the $i^{th}$ group of data Mi that the $i^{th}$ basic processing circuit is responsible for to the $i^{th}$ basic processing circuit.

The control circuit of the main processing circuit successively transfers data in the vector P to a first basic processing circuit.

In an alternative example, each time, the control circuit of the main processing circuit transfers one or a plurality of data in the vector P.

After the $i^{th}$ basic processing circuit receives the data of the vector P, the $i^{th}$ basic processing circuit transfers the data of the vector P to an $i+1^{th}$ basic processing circuit that is connected to the $i^{th}$ basic processing circuit.

After each basic processing circuit receives one or a plurality of data from one or a plurality of rows of the matrix S and one or a plurality of data from the vector P, the basic processing circuit performs computations (the computations include but are not limited to multiplication or addition).

In an alternative example, each time, a basic processing circuit performs multiplication on one group or a plurality of groups of two sets of data, then accumulates results in the register and/or the on-chip cache.

In an alternative example, each time, a basic processing circuit computes an inner product of one group or a plurality of groups of two vectors, then accumulates results in the register and/or on-chip cache.

In an alternative example, the computation result may be a final result or an intermediate result of an inner product computation.

The basic processing circuit transfers a local computation result to another basic processing circuit that is connected to the basic processing circuit or the main processing circuit.

In an alternative example, corresponding to a structure shown in FIG. 2d, only the output interface of a last basic processing circuit in each column is connected to the main processing circuit. In this case, only the last basic processing circuit can directly transfer a local computation result to the main processing circuit. Computation results of other basic processing circuits all need to be transferred to subsequent basic processing circuits, and then be transferred by the subsequent basic processing circuits to basic processing circuits after the subsequent basic processing circuits, until the computation results are transferred to the last basic processing circuit. The last basic processing circuit accumulates a local computation result with results received from other basic processing circuits of the column to obtain an intermediate result and transfers the intermediate result to the main processing circuit. The last basic processing circuit may also transfer the local computation result and the results received from other basic processing circuits of the column to the main processing circuit directly.

In an alternative example, corresponding to a structure of FIG. 2e, each basic processing circuit has an output interface that is connected to the main processing circuit. In this case, each basic processing circuit can transfer a local computation result to the main processing circuit directly.

After the basic processing circuit receives a computation result from another basic processing circuit, the basic processing circuit transfers the data to yet another basic processing circuit that is connected to the basic processing circuit or to the main processing circuit.

The main processing circuit receives results of M inner product computations. The results serve as a computation result of the matrix-multiply-vector computation.

The present disclosure uses the circuit device to perform a matrix-multiply-matrix computation.

Figure 2F:
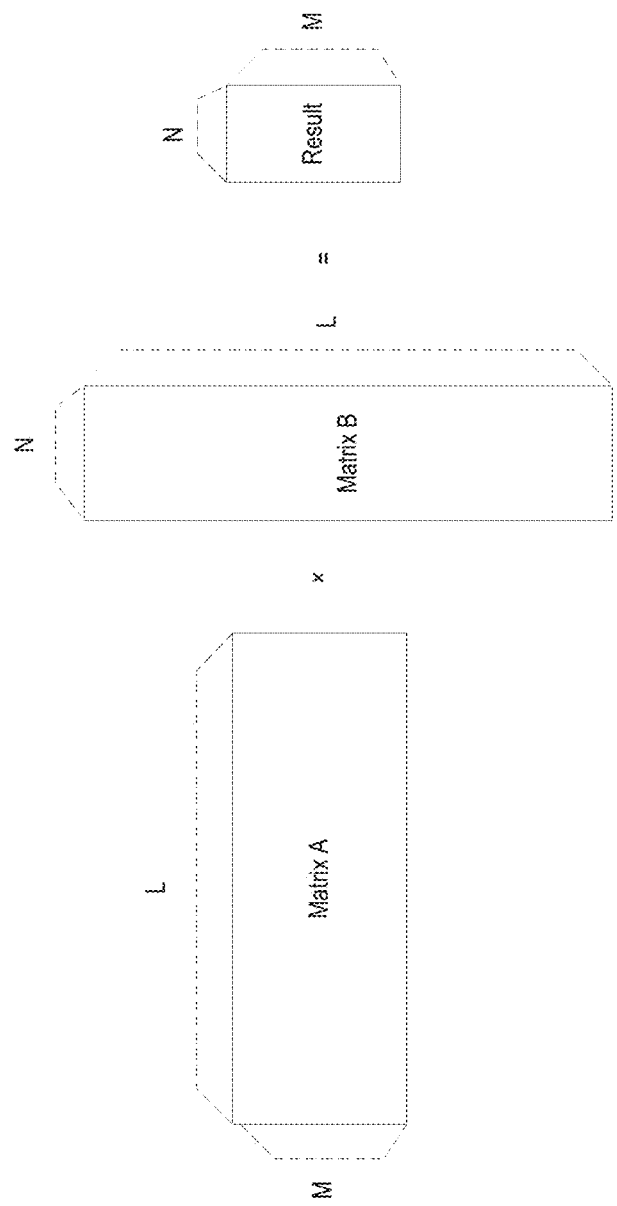
FIG. 2f is a schematic diagram showing a matrix-multiply-vector computation.

Below is a description of performing multiplication of a matrix S with a size of M rows and L columns and a matrix P with a size of L rows and N columns (each row of the matrix S is as long as each column of the matrix P, which is as shown in FIG. 2f).

The method is explained by using the device of FIG. 1b.

The method includes: converting, by the data type conversion circuit of the main processing circuit, a matrix S and a matrix P into fixed point data; and transferring, by the control circuit of the main processing circuit, data of some or all rows of the matrix S to basic processing circuits that are directly connected to the main processing circuit via horizontal data input interfaces (for instance, gray vertical data pathways at the top of FIG. 1b).

In an alternative example, each time, the control circuit of the main processing circuit transfers a number or some numbers of data in a row of the matrix S to a basic processing circuit (for instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . ; or first two numbers in the $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . ).

In an alternative example, each time, the control circuit of the main processing circuit transfers a number or some numbers of some rows of data of the matrix S to a basic processing circuit (for instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, 3rd numbers in the $3^{rd}$, $4^{th}$, and $5^{th}$ rows are transferred at a $3^{rd}$ time, . . . ; or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . ).

The control circuit of the main processing circuit transfers data of some or all columns of the matrix P to basic processing circuits that are directly connected to the main processing circuit via vertical data input interfaces (for instance, gray horizontal data pathways on the left of the basic processing circuit array shown in FIG. 1b).

In an alternative example, each time, the control circuit of the main processing circuit transfers a number or some numbers of a column of the matrix P to a basic processing circuit (for instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . ; or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time, . . . ).

In an alternative example, each time, the control circuit of the main processing circuit transfers a number or some numbers of some columns of data of the matrix P to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . ; or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time, . . . .

After a basic processing circuit receives the data of the matrix S, the basic processing circuit transfers the data to a subsequent basic processing circuit connected to the basic processing circuit via a horizontal data output interface of the basic processing circuit (for instance, white horizontal data pathways at the center of the basic processing circuit array shown in FIG. 1b). After a basic processing circuit receives the data of matrix P, the basic processing circuit transfers the data to a subsequent basic processing circuit connected to the basic processing circuit via a vertical data output interface of the basic processing circuit (for instance, white vertical data pathways at the center of the basic processing circuit array shown in FIG. 1b).

Each basic processing circuit performs computations on received data.

In an alternative example, each time, a basic processing circuit performs multiplication on one group or a plurality of groups of two sets of data, then accumulates results in the register and/or the on-chip cache.

In an alternative example, each time, the basic processing circuit computes an inner product of one group or a plurality of groups of two vectors, then accumulate results in the register and/or on-chip cache.

After a basic processing circuit obtain a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, in FIG. 1b, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, as shown in FIG. 1b, basic processing circuits at a bottom row transfer results to the main processing circuit directly, and other basic processing circuits transfer results downwards via vertical output interfaces).

The main processing circuit receives inner product computation results transferred by the respective basic processing circuits to obtain an output result.

The present disclosure further provides an example of a method of a matrix-multiply-matrix computation.

The method uses a basic processing circuit array arranged according to the manner shown in FIG. 1b. It is assumed that there are h rows and w columns.

The method includes: converting, by the data type conversion circuit of the main processing circuit, the data type of a matrix S and a matrix P; and dividing, by the control circuit of the main processing circuit, the h rows of data of the matrix S into h groups, where an $i^{th}$ basic processing circuit performs the computations of an $i^{th}$ group (a set of rows in the group of data is referred to as Hi), and a method of grouping the h rows of data is any grouping method as long as there is no repeated allocation.

In an alternative example, the following allocation method may be used: allocating, by the control circuit of the main processing circuit, a $j^{th}$ row to a j % $h^{th}$ basic processing circuit.

As an alternative example, in a case where rows cannot be grouped evenly, some rows may be grouped evenly first, and the remaining rows may be allocated in any manner.

The method further includes: dividing, by the control circuit of the main processing circuit, the W columns of data of the matrix P into w groups, where the $i^{th}$ basic processing circuit performs the computations of an $i^{th}$ group (a set of rows in the group of data is referred to as Wi), and a method of grouping the W columns of data is any grouping method without repeated allocation;

in an alternative example, the following allocation method may be used: the control circuit of the main processing circuit allocates a $j^{th}$ row to a j % $w^{th}$ basic processing circuit;

as an alternative example, in a case where columns cannot be grouped evenly, some columns may be grouped evenly first, and the remaining columns may be allocated in any manner.

Alternatively or additionally, the control circuit of the main processing circuit transfers data in all or some rows of the matrix S to a first basic processing circuit in each row of the basic processing circuit array.

In an alternative example, each time, the control circuit of the main processing circuit transfers one or a plurality of data in a row of data of an $i^{th}$ group of data Hi that a $1^{st}$ basic processing circuit of an $i^{th}$ row of the basic processing circuit array is responsible for to the $1^{st}$ basic processing circuit.

In an alternative example, each time, the control circuit of the main processing circuit transfers one or a plurality of data in each row of some or all rows of the $i^{th}$ group of data Hi that the $1^{st}$ basic processing circuit of the $i^{th}$ row of the basic processing circuit array is responsible for to the $1^{st}$ basic processing circuit.

The control circuit of the main processing circuit transfers data in some or all columns of the matrix P to a $1^{st}$ basic processing circuit in each column of the basic processing circuit array.

In an alternative example, each time, the control circuit of the main processing circuit transfers one or a plurality of data in a column of data of an $i^{th}$ group of data Wi that a $1^{st}$ basic processing circuit of an $i^{th}$ column of the basic processing circuit array is responsible for to the $1^{st}$ basic processing circuit.

In an alternative example, each time, the control circuit of the main processing circuit transfers one or a plurality of data in each column of some or all columns of an $i^{th}$ group of data Ni that the $1^{th}$ basic processing circuit of the $i^{th}$ column of the basic processing circuit array is responsible for to the $1^{th}$ basic processing circuit.

After a basic processing circuit receives the data of the matrix S, the basic processing circuit transfers the data to a subsequent basic processing circuit connected to the basic processing circuit via a horizontal data output interface of the basic processing circuit (for instance, white horizontal data pathways at the center of the basic processing circuit array shown in FIG. 1b). After a basic processing circuit receives the data of matrix P, the basic processing circuit transfers the data to a subsequent basic processing circuit connected to the basic processing circuit via a vertical data output interface of the basic processing circuit (for instance, white vertical data pathways at the center of the basic processing circuit array shown in FIG. 1b).

Each basic processing circuit performs computations on received data.

In an alternative example, each time, a basic processing circuit performs multiplication on one group or a plurality of groups of two sets of data, then accumulates results in the register and/or the on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by each basic processing circuit to obtain an output result.

The words "horizontal", "vertical", and the like used in the description above are only for the purpose of explaining the example shown in FIG. 1b. In a certain application, it is only required that "horizontal" and "vertical" interfaces of each unit represent two different interfaces.

The present disclosure can use the circuit device to perform a fully connected computation.

If input data of a fully connected layer is a vector (in other words, a case where input of a neural network is a single sample), a weight matrix of the fully connected layer serves as a matrix S, an input vector serves as a vector P. A matrix-multiply-vector computation can be performed according to the method of the device.

If the input data of the fully connected layer is a matrix (in other words, a case where the input of the neural network is a plurality of samples), the weight matrix of the fully connected layer serves as the matrix S, the input vector serves as a matrix P, or the weight matrix of the fully connected layer serves as the matrix P, and the input vector serves as the matrix S. A matrix-multiply-matrix computation may be performed according to the method of the device.

The present disclosure can use the circuit device to perform a convolution computation.

Figure 3:
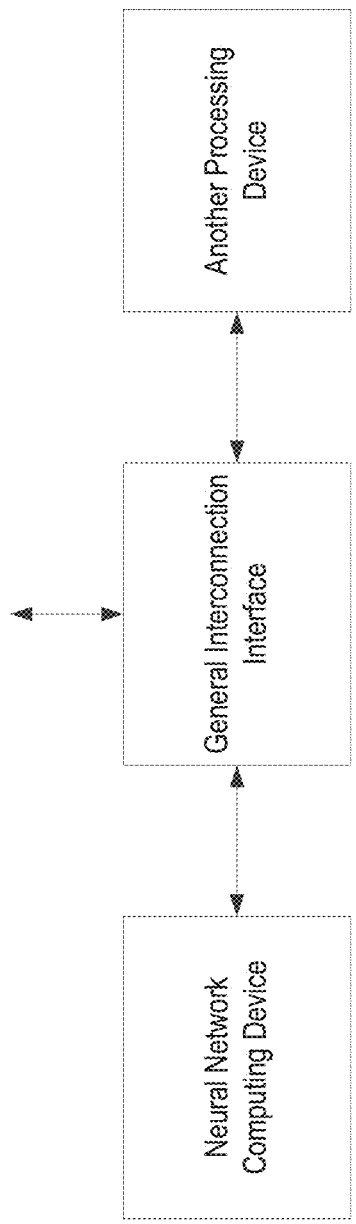
FIG. 3 is a structural diagram of a combined processing device according to the disclosure.
Figure 3A:
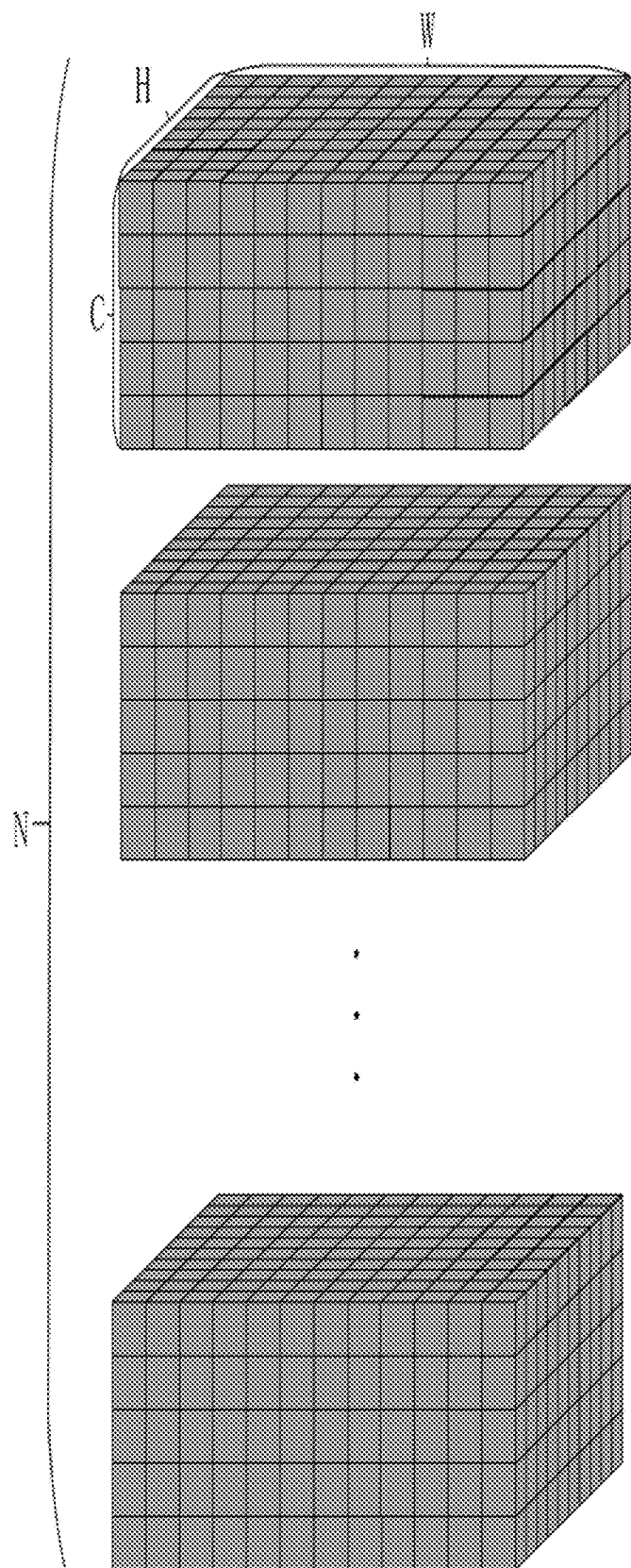
FIG. 3a is a schematic diagram of convolution input data.
Figure 3B:
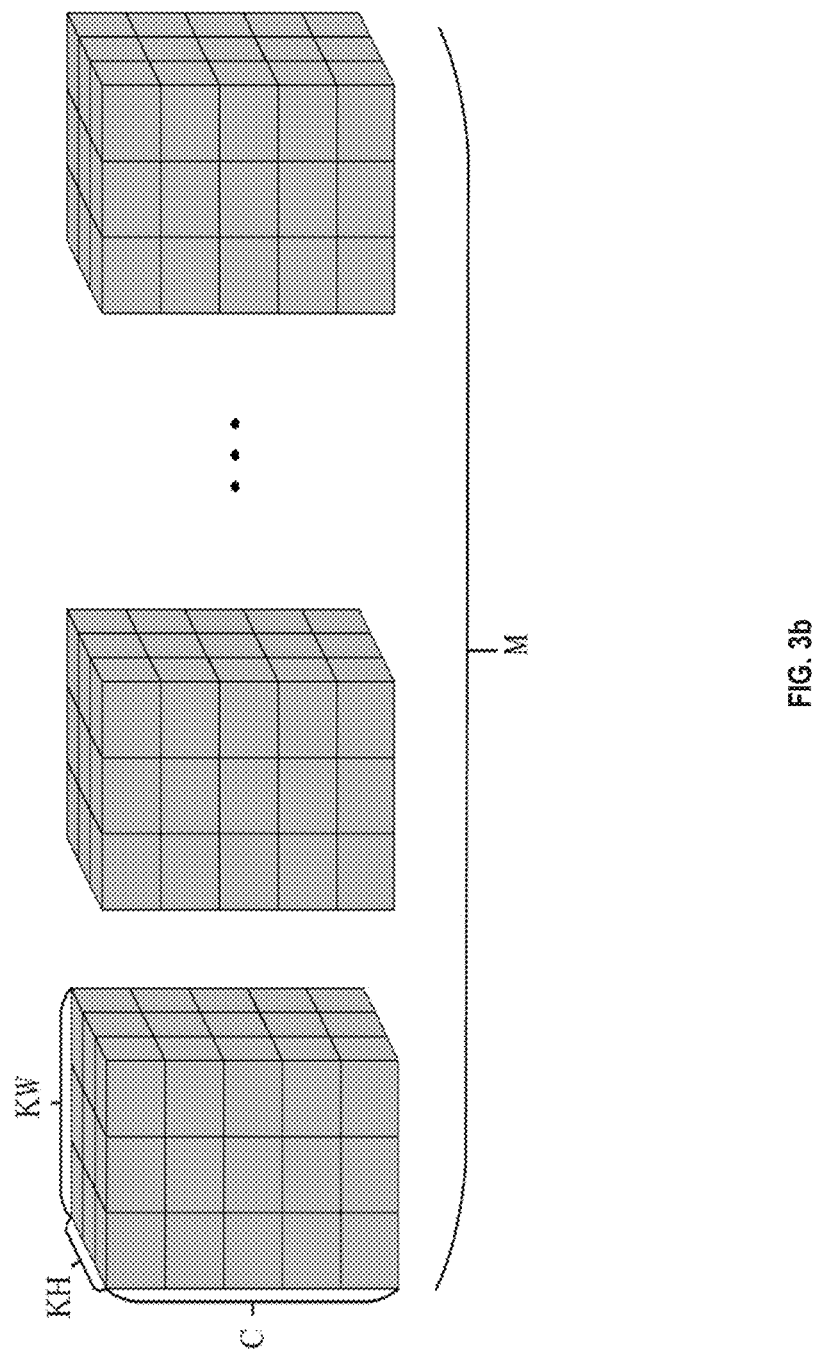
FIG. 3b is a schematic diagram of a convolution kernel.
Figure 3C:
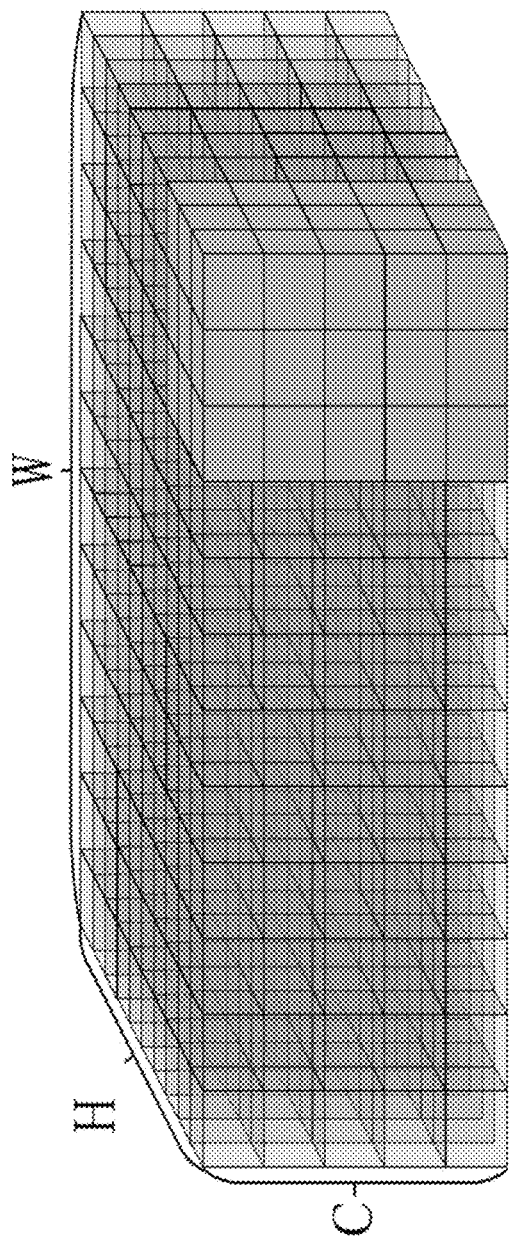
FIG. 3c is a schematic diagram of a computation window of a three-dimensional data block of input data.
Figure 3D:
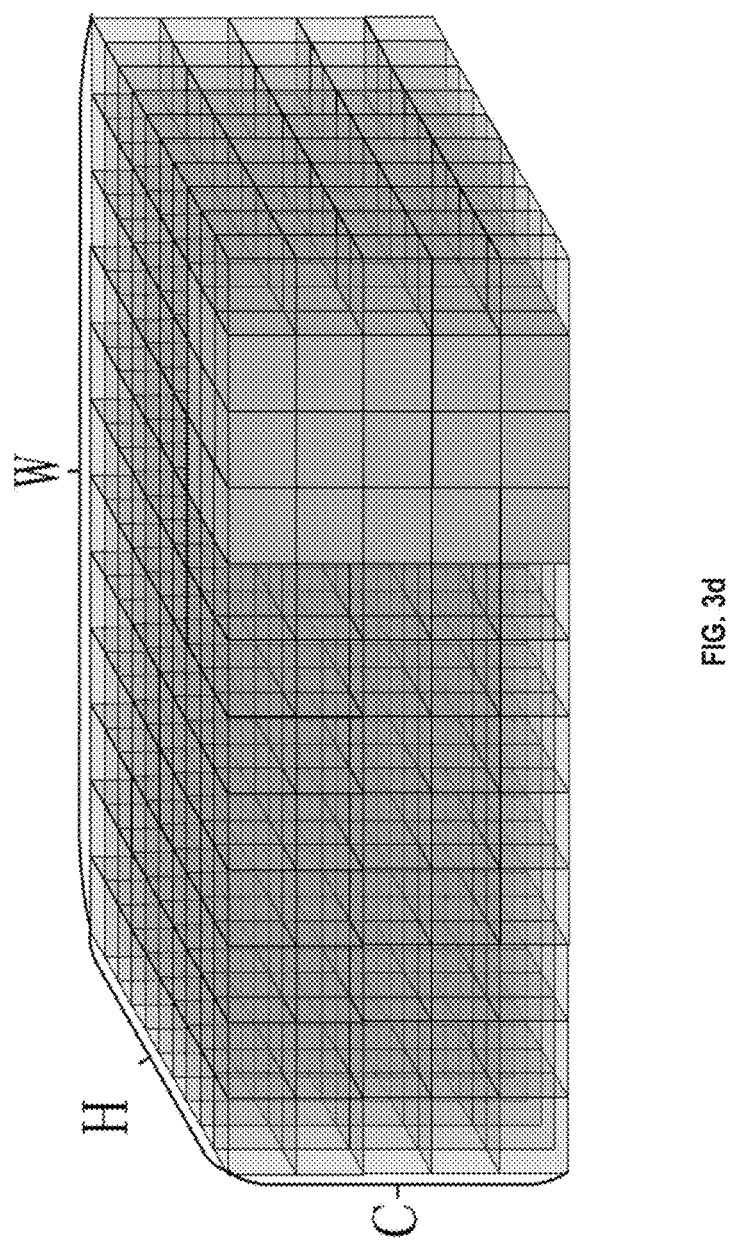
FIG. 3d is a schematic diagram of another computation window of a three-dimensional data block of input data.
Figure 3E:
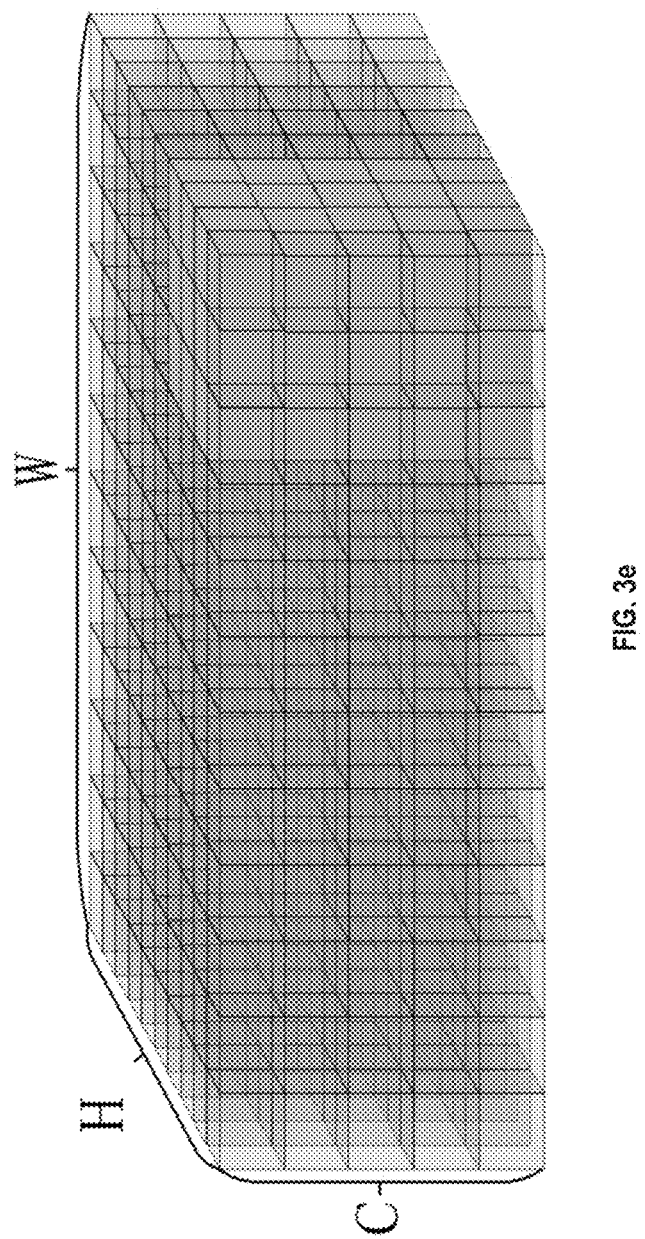
FIG. 3e is a schematic diagram of another computation window of a three-dimensional data block of input data.

Below is a description of the convolution computation. A block in the drawing represents one data, input data is shown by FIG. 3a (N samples, each sample has C channels, and a feature map of each channel has a height of H and a width of W). A weight, which is a convolution kernel, is shown by FIG. 3b (with M convolution kernels of which each has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 3c shows an inner product computation of a convolution kernel at a position at lower right corner of a sample of input data. FIG. 3d shows the convolution kernel slides leftwards for one grid. FIG. 3e shows the convolution kernel slides upwards for one grid.

The method is explained by using the device of FIG. 1b.

The method includes: converting, by the data type conversion circuit of the main processing circuit, data in some or all convolution kernels of the weight to fixed point data; transferring, by the control circuit of the main processing circuit, data of some or all convolution kernels of the weight to basic processing circuits that are directly connected to the main processing circuit via horizontal data input interfaces (for instance, gray vertical data pathways at the top of FIG. 1b).

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . , or first two numbers in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . , or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . .

The control circuit of the main processing circuit classifies input data according to positions of convolution, and transfers data of some or all positions of convolution in the input data to the basic processing circuits that are directly connected to the main processing circuit via the vertical data input interfaces (for instance, the gray horizontal data pathways on the left of the basic processing circuit array shown in FIG. 1b).

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . , or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time, . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time, . . . .

After the basic processing circuit receives the data of the weight, the basic processing circuit transfers the data to a subsequent basic processing circuit that is connected to the basic processing circuit via a horizontal data output interface of the basic processing circuit (for instance, horizontal data pathways filled in white at the center of the basic processing circuit array shown in FIG. 1b). After the basic processing circuit receives the input data, the basic processing circuit transfers the data to a subsequent basic processing circuit that is connected to the basic processing circuit via a vertical data output interface of the basic processing circuit (for instance, vertical data pathways filled in white at the center of the basic processing circuit array shown in FIG. 1b).

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, in FIG. 1b, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit may transfer the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by the respective basic processing circuit to obtain an output result.

The present disclosure provides a method of using the circuit device to perform an operation of giving a bias.

The vector computing unit circuit of the main processing circuit may be used to realize a function of adding two vectors together or adding two matrices together.

The vector computing unit circuit of the main processing circuit may be used to realize a function of adding a vector to each row of a matrix, or to each column of a matrix.

In an alternative example, the matrix may be from a result of a matrix-multiply-matrix computation performed by the device.

In an alternative example, the vector may be from a result of a matrix-multiply-vector computation performed by the device.

In an alternative example, the matrix may be from data received from the external by the main processing circuit of the device.

In an alternative example, the vector may be from data received from the external by the main processing circuit of the device.

Data sources of the matrix and/or the vector may include but are not limited to the above-mentioned data sources.

The present disclosure provides a method of using the circuit device to perform an activation function computation.

The method includes: using the activation circuit of the main processing circuit to input a vector, and computing to obtain an activation vector of the vector.

In an alternative example, the activation circuit of the main processing circuit performs a computation to obtain a numerical value for each value of an input vector according to an activation function (input of the activation function is a numerical value, and output is also a numerical value), and outputs the numerical value to a corresponding position of an output vector.

In an alternative example, the activation function is: y=max(m, x). x denotes an input numerical value, y denotes an output numerical value, and m denotes a constant.

In an alternative example, the activation function is: y=tanh(x). x denotes an input numerical value, and y denotes an output numerical value.

In an alternative example, the activation function is: y=sigmoid(x). x denotes an input numerical value, y denotes an output numerical value.

In an alternative example, the activation function is a piecewise linear function.

In an alternative example, the activation function is a function of randomly inputting a number and outputting a number.

In an alternative example, a source of the input vector may include but is not limited to: an external data source of the device.

In an alternative example, the input data may come from a computation result of a matrix-multiply-vector computation performed by the device.

In an alternative example, the input data may come from a computation result of a matrix-multiply-matrix computation performed by the device.

The main processing circuit of the device computes to obtain a result.

In an alternative example, the input data may come from a computation result obtained after the main processing circuit of the device is biased.

The present disclosure provides a method of using the device to realize BLAS (Basic Linear Algebra Subprograms).

A GEMM computation refers to a computation of matrix-matrix multiplication in a BLAS library. A common representation of the computation is C=alpha*op(S)*op(P)+beta*C. A and B denote two input matrices, C denotes an output matrix, alpha and beta denote scalars, op denotes an operation performed on the matrix S or P. In addition, other supporting integers may be used as parameters to explain the width and height of the matrices A and B.

A step of using the device to realize the GEMM computation is:

before performing an op operation, the main processing circuit may perform data type conversion on the input matrix S and the matrix P;

performing, by the conversion circuit of the main processing circuit, corresponding op operation on the matrix S and the matrix P respectively.

In an alternative example, the op operation may be a matrix transposition operation which can be realized by using a vector computation function or data rearrangement function of the main processing circuit (as described above, the main processing circuit has a data rearrangement circuit). In a certain application, the op operation may also be realized by the conversion circuit directly. Taking the matrix transposition operation as an instance, the op operation may be realized by the matrix transposition circuit directly.

In an alternative example, op of a matrix may be null, which means the op operation may not be performed.

The computation method of matrix-multiply-matrix may be used to perform a matrix multiplication computation between op(S) and op(P).

The arithmetic and logic circuit of the main processing circuit may be used to perform an operation of multiplying each value in a result of op(S)*op(P) by alpha.

As an alternative example, in a case where alpha is 1, the operation of multiplying a value by alpha may not be performed.

The arithmetic and logic circuit of the main processing circuit may be used to realize a computation of beta*C.

As an alternative example, in a case where beta is 1, the operation of multiplying by beta may not be performed.

The arithmetic and logic circuit of the main processing circuit may be used to realize a step of adding corresponding positions of matrices alpha*op(S)*op(P) and beta*C together.

As an alternative example, in a case where beta is 0, the operation of adding may not be performed.

A GEMV computation refers to a computation of matrix-vector multiplication in a BLAS library. A common representation of the computation is C=alpha*op(S)*P+beta*C, where S denotes an input matrix, P denotes an input vector, C is denotes output vector, alpha and beta denote scalars, and op denotes an operation performed on the matrix S.

A step of using the device to realize the GEMV computation is:

before an op operation, converting, by the main processing circuit, the data type of the input matrix S and the matrix P; and performing, by the conversion circuit of the main processing circuit, a corresponding op operation on the matrix S.

As an alternative example, op may be a matrix transposition operation. The matrix transposition circuit of the main processing circuit may be used to realize the matrix transposition operation.

As an alternative example, op of a matrix may be null, which means the op operation may not be performed.

The computation method of matrix-multiply-vector may be used to perform a matrix-vector multiplication between the matrix op(S) and the vector op(P).

The arithmetic and logic circuit of the main processing circuit may be used to perform an operation of multiplying each value in a result of op(S)*P by alpha.

As an alternative example, in a case where alpha is 1, the operation of multiplying a value by alpha may not be performed.

The arithmetic and logic circuit of the main processing circuit may be used to realize a computation of beta*C.

As an alternative example, in a case where beta is 1, the operation of multiplying by beta may not be performed.

The arithmetic and logic circuit of the main processing circuit may be used to realize a step of adding corresponding positions of matrices alpha*op(S)*P and beta*C together.

As an alternative example, in a case where beta is 0, the operation of adding may not be performed.

The present disclosure provides a method of converting the type of data, which includes: using the data type conversion circuit of the main processing circuit to convert the type of data.

In an alternative example, a form of data type conversion includes but is not limited to: converting a floating point number to a fixed point number, converting a fixed point number to a floating point number, and the like.

The present disclosure provides a method of updating a weight.

The method includes: using the vector computing unit circuit of the main processing circuit to realize a function of weight updating during neural network training. Specifically, the weight updating refers to a method of using a gradient of the weight to update the weight.

In an alternative example, the vector computing unit circuit of the main processing circuit may be used to perform addition and subtraction computations on the weight and the gradient of the weight, which are two vectors, to obtain a computation result. The computation result is an updated weight.

In an alternative example, the vector computing unit circuit of the main processing circuit may be used to multiply or divide the weight and the gradient of the weight by a number to obtain an intermediate weight and an intermediate gradient of the weight, then perform addition and subtraction computations on the intermediate weight and the intermediate gradient of the weight to obtain a computation result. The computation result is an updated weight.

In an alternative example, the gradient of the weight may first be subject to computations to obtain a group of momentum. Then the momentum and the weight may be subject to addition and subtraction computations to obtain an updated weight.

The present disclosure further provides a method of realizing a backward computation of a fully connected layer.

The backward computation of the fully connected layer has two parts. As shown in the accompanied drawing, an arrow with continuous line represents a process of a forward computation of the fully connected layer, and the part indicated by the dashed line shows a process of the backward computation of the fully connected layer.

It can be seen that the device can be used to perform the backward computation of the fully connected layer according to the method of a matrix-multiply-matrix computation.

The present disclosure provides a method of realizing a backward computation of a convolution layer.

The backward computation of the convolution layer has two parts. As shown in FIG. 4*a*, an arrow with continuous line represents a process of a forward computation of the convolution layer. FIG. 4*b* shows a process of the backward computation of the convolution layer.

The backward computation of the convolution layer as shown in FIG. 4*a* and FIG. 4*b* may be performed by using the device of FIG. 1*a* or the device of FIG. 1*b*. The forward computation or the backward computation is in fact a plurality of neural network operations. The plurality of operations include but are not limited to one or more of: a matrix-multiply-matrix computation, a matrix-multiply-vector computation, a convolution computation, an activation computation, and the like. A method of performing the computations above is similar to the related description in the preceding part, and thus is not explained in detail here.

The present disclosure also provides a combined processing device which includes the above-mentioned neural network computing device, a general interconnection interface, and other processing devices (general-purpose processing devices). The neural network computing device interacts with other processing devices to perform operations specified by users. FIG. 3 is a schematic diagram of the combined processing device.

Other processing devices include one or more of a general-purpose/special-purpose processors such as a central processing unit (CPU), a graphics processing unit (GPU), a neural network processor, and the like. The present disclosure does not restrict a count of processors included in the other processing devices. Other processing devices may serve as interfaces that connect the neural network computing device to external data and control for data moving, and may perform the basic control such as starting and stopping the neural network computing device. Other processing devices may also cooperate with the neural network computing device to complete computation tasks.

The general interconnection interface is configured to transfer data and control instructions between the neural network computing device and other processing devices. The neural network computing device may obtain required input data from the other processing devices and write the data in an on-chip storage device of the neural network computing device. The neural network computing device may obtain control instructions from other processing devices, and write the control instructions in an on-chip control cache of the neural network computing device. The neural network computing device may further read data stored in a storage module of the neural network computing device and transfer the data to the other processing device.

Figure 4:
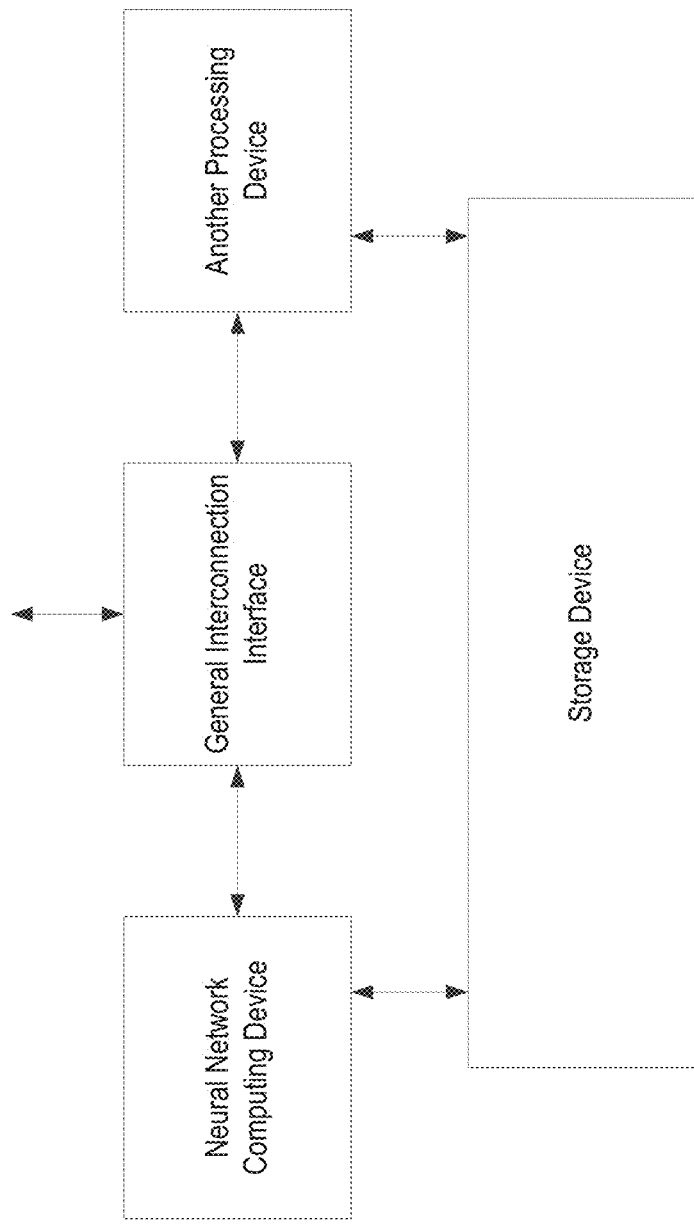
FIG. 4 is another structural diagram of a combined processing device according to the disclosure.
Figure 4A:
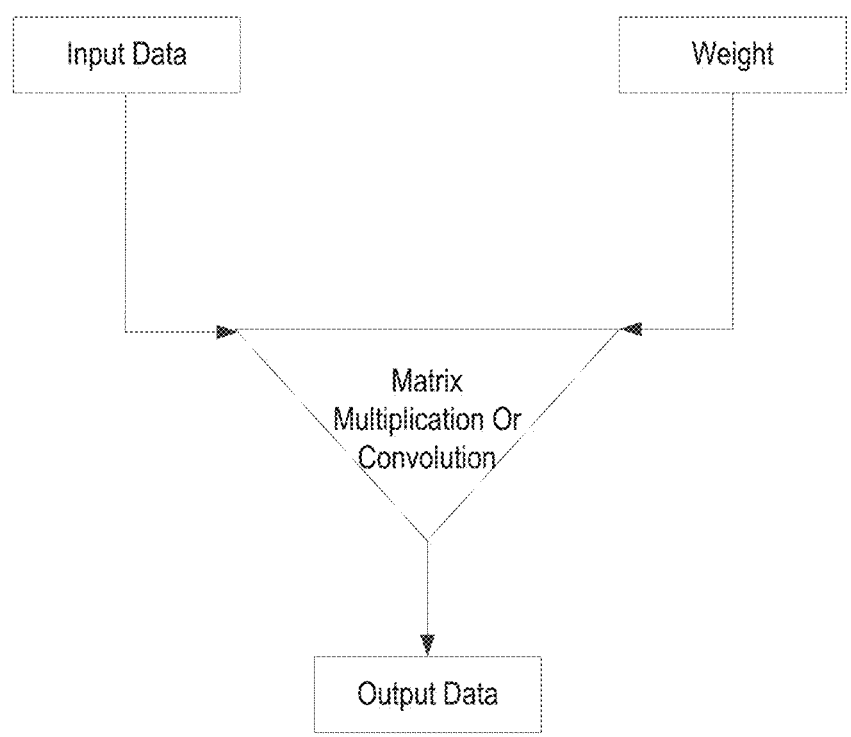
FIG. 4a is a schematic diagram of a neural network forward computation.
Figure 4B:
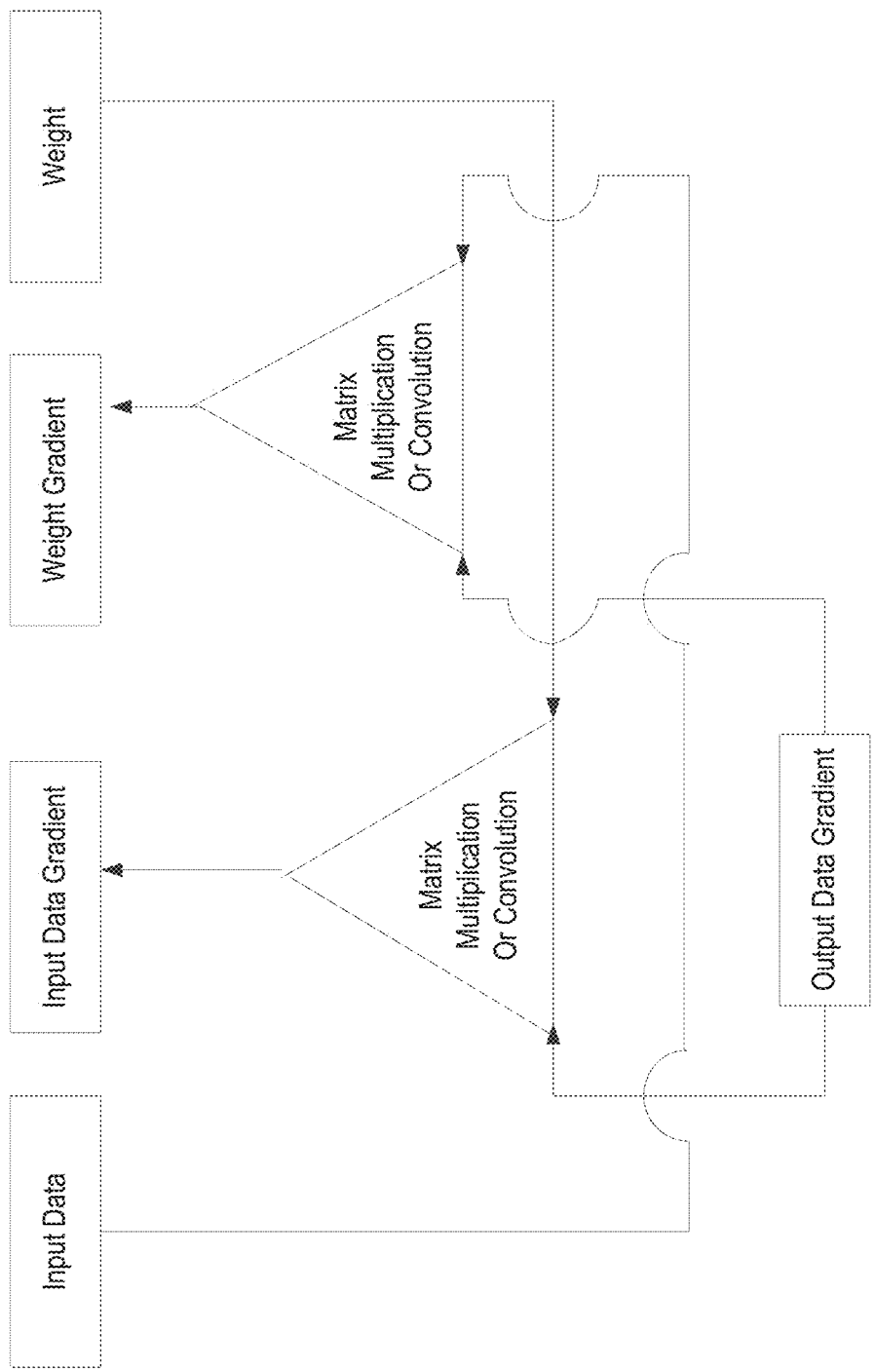
FIG. 4b is a schematic diagram of a neural network backward computation.

As shown in FIG. 4, Alternatively or additionally, the structure may further include a storage device configured to store required data of a present computing unit/computing apparatus or another computing unit, and is particularly suitable for a case where data that needs to be computed cannot be completely stored in an internal memory of the neural network computing device or another processing devices.

The combined processing device can be used as an SOC (System On Chip) of a device including a mobile phone, a robot, a drone, a video surveillance device, and the like, which may effectively reduce the core area of a control component, increase the processing speed, and reduce the overall power consumption. In this case, a universal interconnection interface of the combined processing device may be connected to some components of the device. The some components include webcams, monitors, mice, keyboards, network cards, and WIFI interfaces.

The present disclosure provides a neural network processor board card which can be used in various general-purpose or special-purpose computing system environments or configurations. For instance, personal computers, server computers, handheld or portable devices, tablet devices, smart home, home appliances, multiprocessor systems, microprocessor based systems, robots, programmable consumer electronics, network personal computers, small computers, large computers, distributed computing environments including any of the systems or devices above, and the like.

Figure 5A:
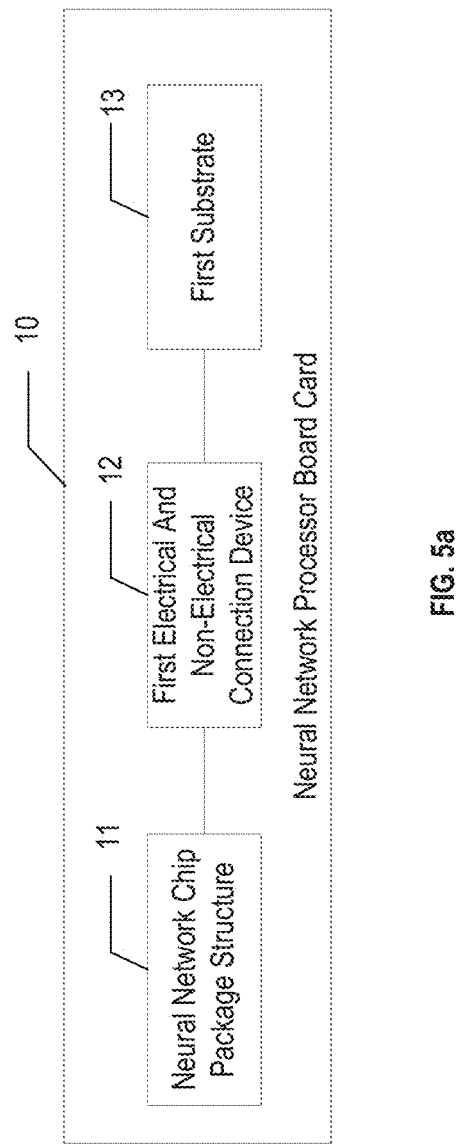
FIG. 5a is a structural diagram of a neural network processor board card according to an example of the present disclosure.
Figure 5B:
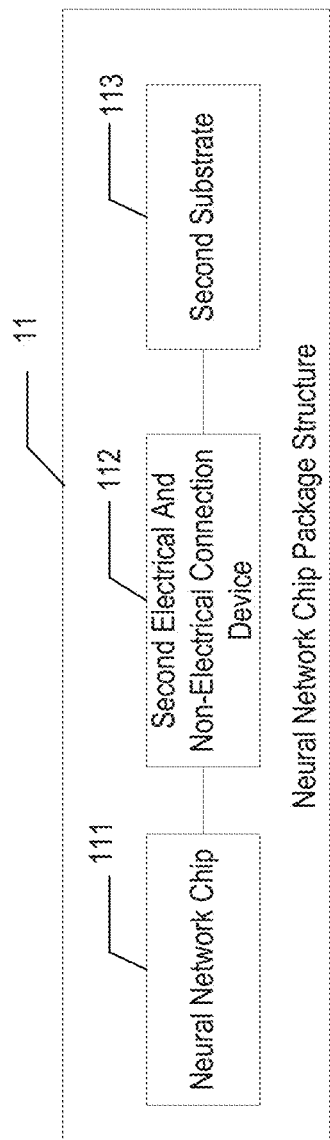
FIG. 5b is a structural diagram of a neural network chip package structure according to an example of the present disclosure.
Figure 5C:
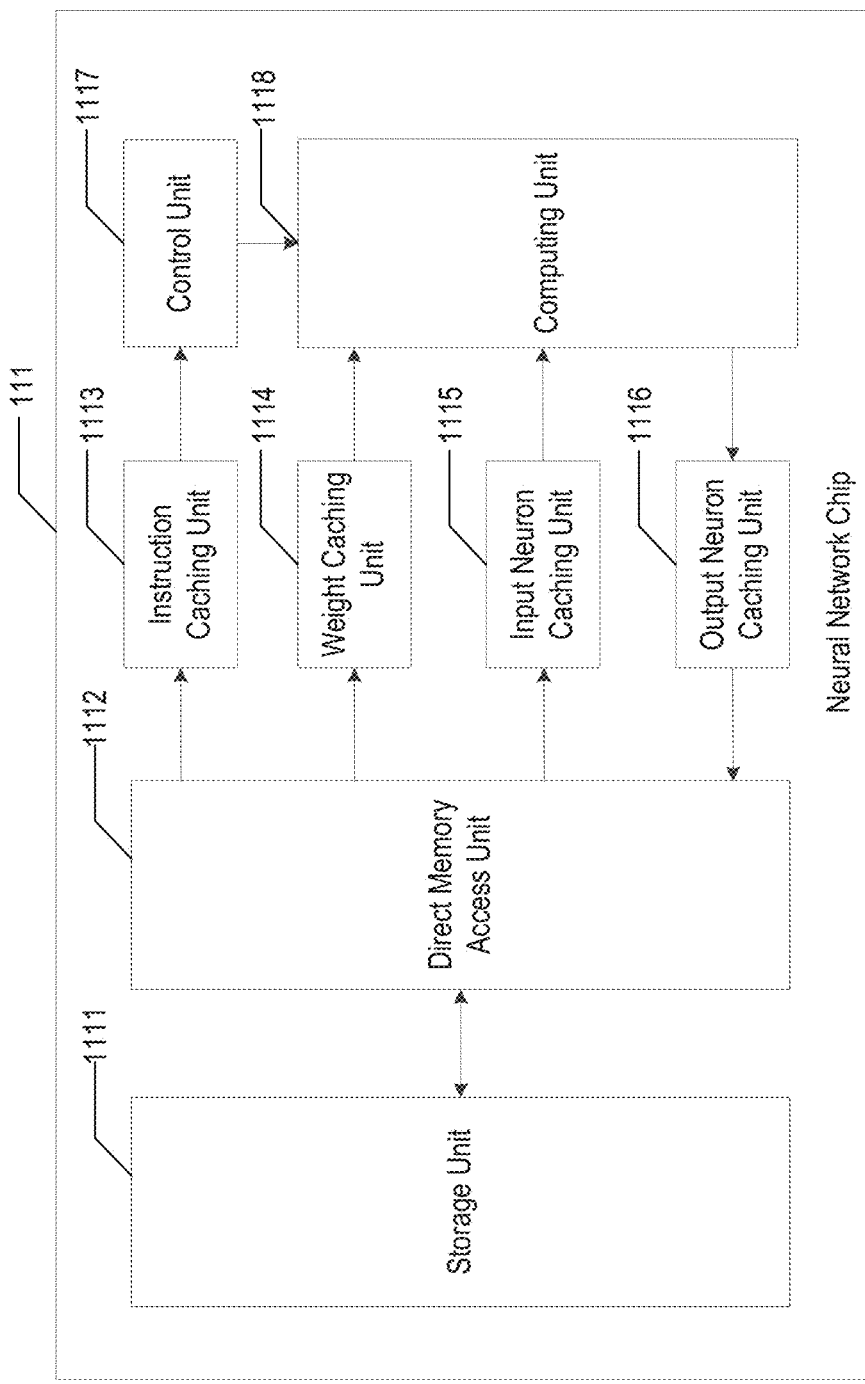
FIG. 5c is a structural diagram of a neural network chip according to an example of the present disclosure.

FIG. 5*a* is a structural diagram of a neural network processor board card according to an example of the present disclosure. As shown in FIG. 5*c*, the neural network processor board card 10 includes a neural network chip package structure 11, a first electrical and non-electrical connection device 12, and a first substrate 13.

The present disclosure does not restrict a specific structure of the neural network chip package structure 11. In some embodiments, as shown in FIG. 5*b*, the neural network chip package structure 11 includes a neural network chip 111, a second electrical and non-electrical connection device 112, and a second substrate 113.

The present disclosure does not restrict a specific form of the neural network chip 111. The neural network chip 111 may include but is not limited to a neural network wafer integrated with a neural network processor, where the wafer may be made of silicon material, germanium material, quantum material, or molecular material. The neural network wafer may be packaged according to a real situation (for example, a harsh environment) and different application requirements, so that most of the neural network wafer may be wrapped, and leads on the neural network wafer may be connected to the outside of the packaging structure through conductors such as gold wire, which can be used for circuit connection with an outer layer.

The present disclosure does not restrict a specific structure of the neural network chip 111. Alternatively or additionally, the device shown in FIG. 1*a* and FIG. 1*b* may be used as reference.

The present disclosure does not restrict types of the first substrate 13 and the second substrate 113. The first substrate and the second substrate may be a printed circuit board (PCB) or a printed wiring board (PWB), and may also be another type of circuit board. The present disclosure does not restrict the material that the PCB is made of.

The second substrate 113 of the present disclosure may be used to bear the neural network chip 111, and the chip package structure obtained by connecting the neural network chip 111 and the second substrate 113 through the second electrical and non-electrical connection device 112 is used for protecting the neural network chip 111, so that the neural network chip package structure 11 and the first substrate 13 can be further packaged.

The present disclosure does not restrict a specific manner for packaging and a corresponding structure of the manner for packaging of the second electrical and non-electrical connection device 112. An appropriate package manner can be selected and be subject to simple improvement according to a certain situation and different application requirements, such as Flip Chip Ball Grid Array Package (FCBGAP), Low-profile Quad Flat Package (LQFP), Quad Flat Package with Heat Sink (HQFP), Quad Flat Non-lead Package (QFN), or a Fine-Pitch Ball Grid Package (FBGA) and other package manners.

A flip chip may be suitable for a case where the requirement on the area after packaging is high or an inductor of a conductive wire and a transmission time of a signal are sensitive. In addition, a package manner of wire bonding may be adopted to reduce the cost and increase the flexibility of the package structure.

Ball Grid Array may provide more leads, and the average wire length of the leads is short, which can transfer signals at high speed, where the package may be replaced by Pin Grid Array (PGA), Zero Insertion Force (ZIF), Single Edge Contact Connection (SECC), Land Grid Array (LGA), and the like.

Figure 6:
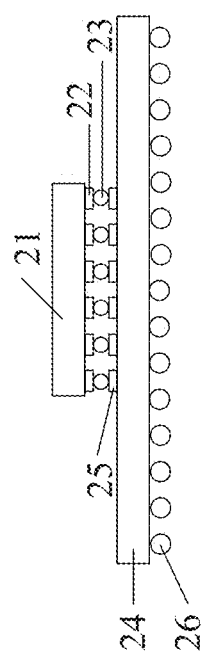
FIG. 6 is a schematic diagram of a neural network chip package structure according to an example of the present disclosure.

In some embodiments, the package manner of Flip Chip Ball Grid Array may be adopted to package the neural network chip 111 and the second substrate 113. Please refer to FIG. 6 for a schematic diagram of a package structure of the neural network chip. As shown in FIG. 6, the neural network chip package structure may include a neural network chip 21, a pad 22, a ball 23, a second substrate 24, a connection point 25 on the second substrate 24, and a lead 26.

The pad 22 is connected to the neural network chip 21, and the ball 23 is formed by welding between the pad 22 and the connection point 25 on the second substrate 24, in this way, the neural network chip 21 and the second substrate 24 is connected, thereby realizing the package of the neural network chip 21.

The lead 26 is used to connect an external circuit of the package structure (for instance, the first substrate 13 on the neural network processor board card 10) for transferring external data and internal data, which may facilitate data processing by the neural network chip 21 or a corresponding neural network processor of the neural network chip 21. A type and quantity of leads are not restricted in the present disclosure. Different lead types can be selected according to different packaging technologies, and leads can be arranged according to certain rules.

In some embodiments, the neural network chip package structure may further include an insulating filler disposed in the gap between the pad 22, the ball 23, and the connection point 25 for preventing interference between balls.

The material of the insulating filler may be silicon nitride, silicon oxide, or silicon oxynitride; and the interference may include electromagnetic interference, inductance interference, and the like.

In some embodiments, the neural network chip package structure may further include a heat dissipation device for dissipating heat generated during the operation of the neural network chip 21. The heat dissipation device may be a piece of metal with good thermal conductivity, a heat sink, or a radiator such as a fan.

Figure 6A:
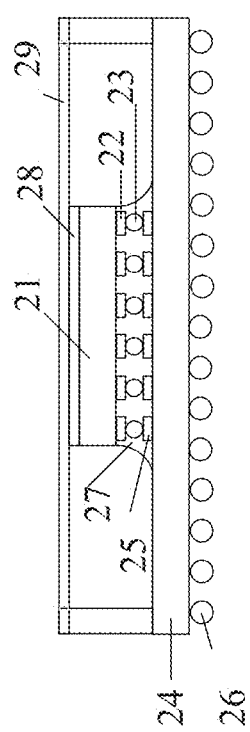
FIG. 6a is a schematic diagram of another neural network chip package structure according to an example of the present disclosure.

For instance, as shown in FIG. 6a, the neural network chip package structure 11 may include: a neural network chip 21, a pad 22, a ball 23, a second substrate 24, a connection point 25 on the second substrate 24, a lead 26, an insulating filler 27, thermal compound 28, and a fin 29 with metal housing. Among them, the thermal compound 28 and the fin 29 with metal housing are configured to dissipate the heat generated during the operation of the neural network chip 21.

In some embodiments, the neural network chip package structure 11 may further include a reinforcing structure, which is connected to the pad 22, and is buried in the ball 23 to improve the connection strength between the ball 23 and the pad 22.

The reinforcing structure may be a metal wire structure or a columnar structure, which is not restricted herein.

A specific form of the first electrical and non-electrical device 12 is not restricted in the present disclosure. Please refer to the description of the second electrical and non-electrical device 112. In other words, the neural network chip package structure may be packaged by welding, or by connecting the second substrate 113 and the first substrate 13 through a connecting line or by means of plugging, so that the first substrate 13 or the neural network chip package structure 11 can be replaced conveniently later.

In some embodiments, the first substrate 13 may include a memory unit interface for expanding storage capacity, such as a Synchronous Dynamic Random Access Memory (SDRAM), and a Double Date Rate (DDR) SDRAM, and the like. By expanding the memory, the processing capacity of the neural network processor may be improved.

The first substrate 13 may further include a Peripheral Component Interconnect-Express (PCI-E or PCIe) interface, a Small Form-factor Pluggable (SFP) interface, and an Ethernet interface, a Controller Area Network (CAN) interface, and the like, which can be used for data transfer between the package structure and external circuits. In this way, the computational speed may be improved, and the operation may be easier.

The neural network processor is packaged into a neural network chip 111, the neural network chip 111 is packaged into a chip package structure 11, and the neural network chip package structure 11 is packaged into a neural network processor board card 10. Data interaction with an external circuit (for instance, a computer motherboard) may be performed through an interface (slot or ferrule) on the board card, that is, the function of the neural network processor may be implemented by using the neural network processor board card 10 directly, which may also protect the neural network chip 111. In addition, other modules may be added to the neural network processor board card 10, which may improve the application range and computational efficiency of the neural network processor.

An example of the present disclosure provides an electronic device including the neural network processor board card 10 or the neural network chip package structure 11.

The electronic device includes a data processing device, a robot, a computer, a printer, a scanner, a tablet, a smart terminal, a mobile phone, a traffic recorder, a navigator, a sensor, a webcam, a server, a camera, a video camera, a projector, a watch, a headphone, a mobile storage, a wearable device, a vehicle, a household appliance, and/or a medical equipment.

The vehicle includes an airplane, a ship, and/or a car. The household electrical appliance includes a television, an air conditioner, a microwave oven, a refrigerator, an electric rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

The examples of the present disclosure have been described in detail above. The principles and implementation manners of the present disclosure have been described with the examples. The descriptions of the examples are only used for facilitating understanding of the methods and core ideas of the present disclosure. Persons of ordinary skill in the art may change the implementation and application scope according to the ideas of the present disclosure. In summary, the content of this specification should not be construed as a limitation on the present disclosure.

The invention claimed is:

1. An integrated circuit chip device, comprising:
   a main processing circuit; and
   a plurality of basic processing circuits;
   wherein:
   the plurality of basic processing circuits are arranged as an array having h rows and w columns, each basic processing circuit is connected to an adjacent basic processing circuit, the main processing circuit is connected to w basic processing circuits in a first row, w basic processing circuits in an $h^{th}$ row, and h basic processing circuits in a first column;
   the main processing circuit is configured to:
      perform respective neural network computations in series; and
      transfer data to the basic processing circuits that are connected to the main processing circuit;
   at least one of the plurality of basic processing circuits is configured to:
      perform computations in the neural network in parallel according to the transferred data; and
      transfer computation results to the main processing circuit through the basic processing circuits that are connected to the main processing circuit.

2. The integrated circuit chip device of claim 1, wherein:
   the main processing circuit is configured to:
      obtain a data block to be computed and a computation instruction, wherein,
         when the computation instruction is for multiplying a matrix S by a matrix P, the main processing circuit is configured to:
            transfer data in some or all rows of the matrix S to the h basic processing circuits in the first column through horizontal data input interfaces using a control circuit; and
            transfer data of some or all columns of the matrix P to the w basic processing circuits in the first row and the w basic processing circuits in the $h^{th}$ row through vertical data input interfaces.

3. The integrated circuit chip device of claim 2, wherein:
   the control circuit of the main processing circuit is configured to:
      transfer a number or some numbers of data in a plurality of columns of the matrix P to a basic processing circuit.

4. The integrated circuit chip device of claim 2, wherein:
   the at least one of the plurality of basic processing circuits is configured to:
      after receiving the data of the matrix S, transfer the data of the matrix S to a subsequent basic processing circuit connected to the basic processing circuit through a horizontal data output interface of the basic processing circuit; and
      after receiving the data of the matrix P, transfer the data of the matrix P to a subsequent basic processing circuit connected to the basic processing circuit through a vertical data output interface of the basic processing circuit.

5. The integrated circuit chip device of claim 1, wherein:
   the at least one of the plurality of basic processing circuits is configured to:
      perform multiplication on one group of two sets of data or a plurality of groups of two sets of data at a time;
      accumulate results in a register and/or an on-chip cache;
      compute an inner product of one group of two vectors or a plurality of groups of two vectors at a time;
      accumulate results in the register or on-chip cache; and
      after obtaining a result by computing, output the result through a data output interface.

6. The integrated circuit chip device of claim 1, wherein:
   the at least one of the plurality of basic processing circuits is configured to:
      when the basic processing circuit has an output interface that is directly connected to the main processing circuit, output a result through the interface;
      when the basic processing circuit does not have any output interface that is directly connected to the main processing circuit, output a result towards a basic processing circuit that is capable of outputting a result to the main processing circuit directly; and
      after receiving a computation result from another basic processing circuit, transfer the computation result to yet another basic processing circuit that is connected to the basic processing circuit or to the main processing circuit.

7. The integrated circuit chip device of claim 2, wherein:
   when the computation instruction is for performing a fully connected computation, the integrated circuit chip device is further configured to:
      when input data of a fully connected layer is a vector, use a weight matrix of the fully connected layer as a matrix S and an input vector as a vector P; and
      when the input data of the fully connected layer is a matrix, use the weight matrix of the fully connected layer as the matrix S and the input data as a matrix P.

8. The integrated circuit chip device of claim 1, wherein:
   the main processing circuit is configured to obtain a data block to be computed and a computation instruction, wherein:
      when the computation instruction is for performing a convolution computation, the main processing circuit is configured to:
         transfer data in some or all convolution kernels of a weight to the h basic processing circuits in the first column through horizontal data input interfaces using a control circuit; and
         classify input data according to positions of convolution, wherein the control circuit of the main processing circuit is configured to:
            transfer data of some or all positions of convolution in the input data to the w basic processing circuits in the first row and the w basic processing circuits in the $h^{th}$ row through vertical data input interfaces.

9. The integrated circuit chip device of claim 8, wherein the control circuit of the main processing circuit is configured to:
   transfer a number or some numbers of data of a convolution kernel in the weight to a basic processing circuit; or
   transfer a number or some numbers of data of some convolution kernels in the weight to a basic processing circuit.

10. The integrated circuit chip device of claim 8, wherein:
    the integrated circuit chip device is configured to perform a plurality of operations of a forward operation or a backward operation, wherein:

the plurality of operations include at least one of:
a matrix-multiply-matrix computation, a matrix-multiply-vector computation, a convolution computation, or an activation computation.

11. The integrated circuit chip device of claim 1, wherein:
the main processing circuit is configured to:
obtain a data block to be computed and a computation instruction;
classify the data block to be computed into a distribution data block and a broadcasting data block according to the computation instruction;
partition the distribution data block to obtain a plurality of basic data blocks;
distribute the plurality of basic data blocks to the basic processing circuits connected to the main processing circuit; and
broadcast the broadcasting data block to the basic processing circuits connected to the main processing circuit;
the at least one of the plurality of basic processing circuits is configured to:
perform inner product computations on the basic data blocks and the broadcasting data block to obtain computation results; and
transfer the computation results to the main processing circuit; or
the at least one of the plurality of basic processing circuits is configured to:
forward the basic data blocks and the broadcasting data block to another basic processing circuit, wherein the another basic processing circuit is configured to:
perform inner product computations to obtain computation results; and
transfer the computation results to the main processing circuit; and
the main processing circuit is configured to process the computation results to obtain an instruction result of the data block to be computed and the computation instruction.

12. The integrated circuit chip device of claim 11, wherein:
the main processing circuit is configured to broadcast the broadcasting data block as a whole to the basic processing circuits connected to the main processing circuit; and
the at least one of the plurality of basic processing circuits is configured to:
perform inner product processing on the basic data blocks and the broadcasting data block to obtain results of inner product processing;
accumulate the results of inner product processing to obtain computation results; and
transfer the computation results to the main processing circuit.

13. The integrated circuit chip device of claim 1, wherein:
the main processing circuit includes a main register or a main on-chip caching circuit;
each basic processing circuit includes a basic register or a basic on-chip caching circuit; and
the main processing circuit includes at least one of:
a vector computing unit circuit, an arithmetic and logic unit circuit, an accumulator circuit, a matrix transposition circuit, a direct memory access circuit, a data type conversion circuit, or a data rearrangement circuit.

14. An electronic device, comprising:
at least one integrated circuit chip device, comprising:
a main processing circuit; and
a plurality of basic processing circuits;
wherein:
the plurality of basic processing circuits are arranged as an array having h rows and w columns, each basic processing circuit is connected to an adjacent basic processing circuit, the main processing circuit is connected to w basic processing circuits in a first row, w basic processing circuits in an $h^{th}$ row, and h basic processing circuits in a first column;
the main processing circuit is configured to:
perform respective neural network computations in series; and
transfer data to the basic processing circuits that are connected to the main processing circuit;
at least one of the plurality of basic processing circuits is configured to:
perform computations in the neural network in parallel according to the transferred data; and
transfer computation results to the main processing circuit through the basic processing circuits that are connected to the main processing circuit.

15. A method, implemented by an integrated circuit chip device comprising a main processing circuit and a plurality of basic processing circuits, for performing neural network operations, wherein the plurality of basic processing circuits are arranged as an array having h rows and w columns, each basic processing circuit is connected to an adjacent basic processing circuit, the main processing circuit is connected to w basic processing circuits in a first row, w basic processing circuits in an $h^{th}$ row, and h basic processing circuits in a first column, the method comprising:
performing, by the main processing circuit, respective neural network computations in series; and
transferring, by the main processing circuit, data to the basic processing circuits that are connected to the main processing circuit;
performing, by at least one of the plurality of basic processing circuits, computations in the neural network in parallel according to the transferred data; and
transferring, by the at least one of the plurality of basic processing circuits, computation results to the main processing circuit through the basic processing circuits that are connected to the main processing circuit.

16. The method of claim 15, further comprising:
obtaining, by the main processing circuit, a data block to be computed and a computation instruction, wherein, when the computation instruction is for multiplying a matrix S by a matrix P:
transferring, by the main processing circuit, data in some or all rows of the matrix S to the h basic processing circuits in the first column through horizontal data input interfaces using a control circuit; and
transferring, by the main processing circuit, data of some or all columns of the matrix P to the w basic processing circuits in the first row and the w basic processing circuits in the $h^{th}$ row through vertical data input interfaces.

17. The method of claim 16, further comprising:
transferring, by the control circuit of the main processing circuit, a number or some numbers of data in a plurality of columns of the matrix P to a basic processing circuit.

18. The method of claim 16, further comprising:

after receiving the data of the matrix S, transferring, by the at least one of the plurality of basic processing circuits, the data of the matrix S to a subsequent basic processing circuit connected to the basic processing circuit through a horizontal data output interface of the basic processing circuit; and after receiving the data of the matrix P, transferring, by the at least one of the plurality of basic processing circuits, the data of the matrix P to a subsequent basic processing circuit connected to the basic processing circuit through a vertical data output interface of the basic processing circuit.

19. The method of claim 15, further comprising:

performing, by the at least one of the plurality of basic processing circuits, multiplication on one group of two sets of data or a plurality of groups of two sets of data at a time;

accumulating, by the at least one of the plurality of basic processing circuits, results in a register and/or an on-chip cache;

computing, by the at least one of the plurality of basic processing circuits, an inner product of one group of two vectors or a plurality of groups of two vectors at a time;

accumulating, by the at least one of the plurality of basic processing circuits, results in the register or on-chip cache; and after obtaining a result by computing, outputting, by the at least one of the plurality of basic processing circuits, the result through a data output interface.

20. The method of claim 15, further comprising:

when the basic processing circuit has an output interface that is directly connected to the main processing circuit, outputting, by the at least one of the plurality of basic processing circuits, a result through the interface;

when the basic processing circuit does not have any output interface that is directly connected to the main processing circuit, outputting, by the at least one of the plurality of basic processing circuits, a result towards a basic processing circuit that is capable of outputting a result to the main processing circuit directly; and after receiving a computation result from another basic processing circuit, transferring, by the at least one of the plurality of basic processing circuits, the computation result to yet another basic processing circuit that is connected to the basic processing circuit or to the main processing circuit.

\* \* \* \* \*